(12) United States Patent
Wakamatsu

(10) Patent No.: US 8,219,154 B2
(45) Date of Patent: Jul. 10, 2012

(54) POWER TRANSMISSION DEVICE, POWER TRANSMISSION METHOD, PROGRAM, POWER RECEIVING DEVICE AND POWER TRANSFER SYSTEM

(75) Inventor: Masataka Wakamatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 478 days.

(21) Appl. No.: 12/436,552

(22) Filed: May 6, 2009

(65) Prior Publication Data

US 2009/0281678 A1 Nov. 12, 2009

(30) Foreign Application Priority Data

May 12, 2008 (JP) ................ P2008-124892

(51) Int. Cl.
*H04B 1/38* (2006.01)
(52) U.S. Cl. ................... 455/572; 455/573
(58) Field of Classification Search ............ 455/572, 455/573, 127.1, 343.1; 713/300; 700/22, 700/295; 307/32, 64, 66; 320/108, 109; 340/539
See application file for complete search history.

(56) References Cited

U.S. PATENT DOCUMENTS 7,400,911 B2 * 7/2008 Planning et al. ............ 455/572
2009/0254766 A1 * 10/2009 Yamasuge ................. 713/300

FOREIGN PATENT DOCUMENTS

| JP | 62-161435 | 10/1987 |
|---|---|---|
| JP | 2003-224937 | 8/2003 |
| JP | 2009-089244 | 4/2009 |
| JP | 2009-523402 | 6/2009 |
| WO | WO-2007/081971 A2 | 7/2007 |

OTHER PUBLICATIONS

Japanese Office Action for Japanese Patent Application No. 2008-124892, (Draft Date: Apr. 23, 2010).
M. Soljacic et al., "Technology to transfer power by radio developed, 60-W bulb turned on in experiment." Nikkei Electronics 12-3, pp. 117-128 (2007).

* cited by examiner

*Primary Examiner* — Jean B Jeanglaude
(74) *Attorney, Agent, or Firm* — Finnegan, Henderson, Farabow, Garrett & Dunner, L.L.P.

(57) ABSTRACT

There is provided a power transmission device including a communication part that performs communication with an external power transmission device that transmits power, a power transmission part that transmits power to a power receiving device that receives the transmitted power in a non-contact manner, a determination part that determines whether power can be transmitted, based on external power transmission information received by the communication part indicating a start of power transmission by the external power transmission device, and a power transmission control part that controls the power transmission part to selectively transmit power based on a determination result from the determination part.

13 Claims, 25 Drawing Sheets

FIG.12
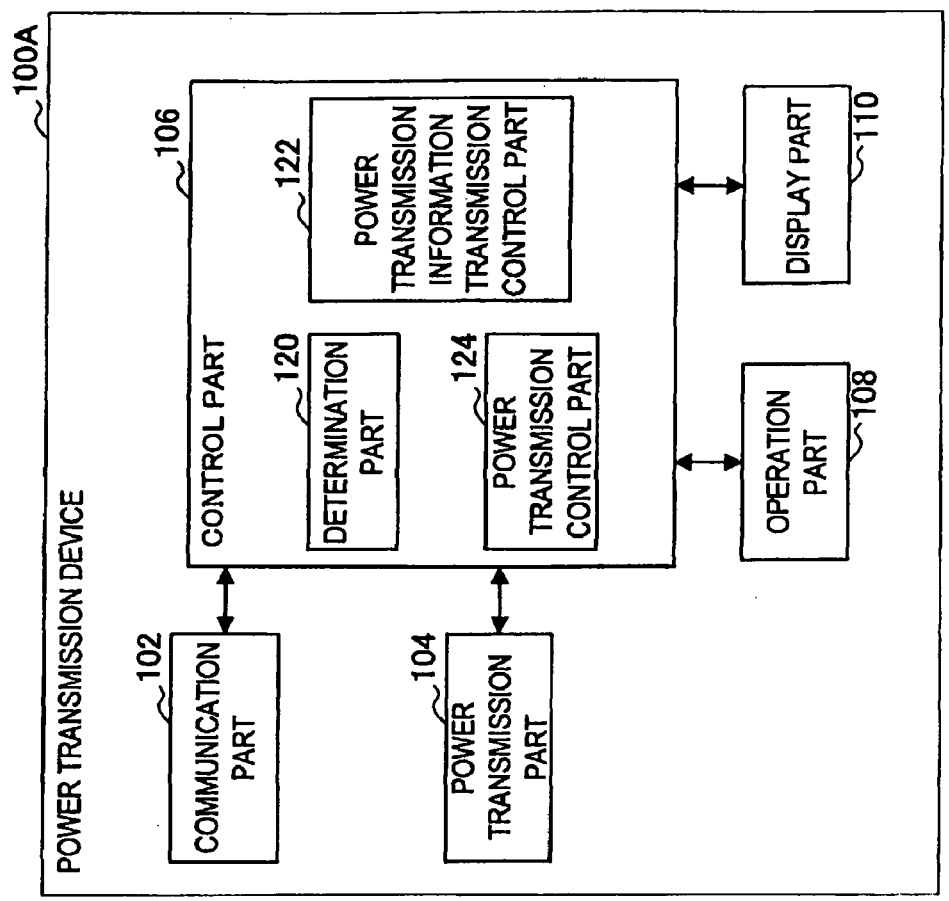
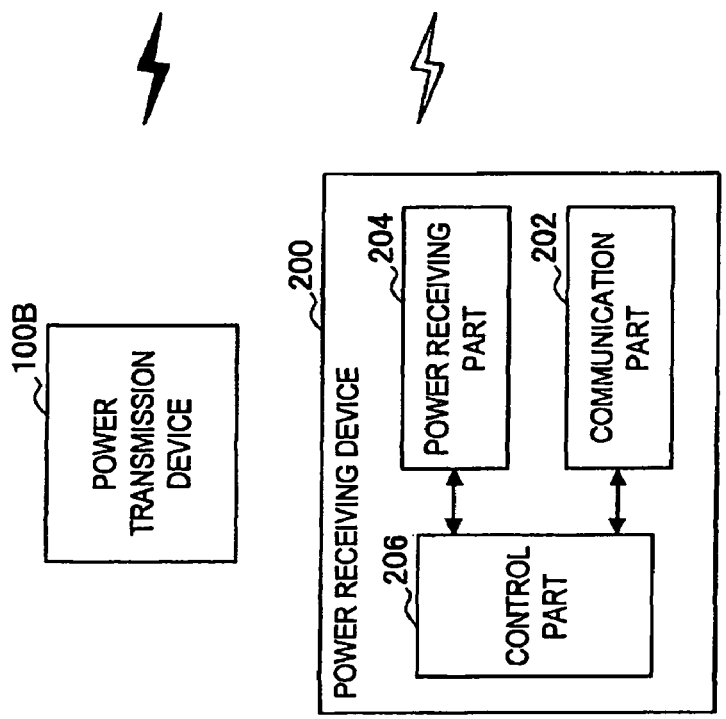

POWER TRANSMISSION DEVICE, POWER TRANSMISSION METHOD, PROGRAM, POWER RECEIVING DEVICE AND POWER TRANSFER SYSTEM

BACKGROUND OF THE INVENTION

1. Field of the Invention

The present invention relates to a power transmission device, power transmission method, program, power receiving device, and power transfer system.

2. Description of the Related Art

In recent years, a power transfer system capable of transferring power between devices in a non-contact manner has become widely available. The power transfer system includes, for example, an IC card system in which a reader/writer (an example of the power transmission device) and an IC card (an example of the power receiving device) are used such as an electronic money system, a ticket gate system of transportation facilities, and a building/room admission system using an employee ID card or the like.

In the meantime, a technology to transfer still larger power for still greater distances has been developed. See, for example, Non-patent Document 1 for a technology to transfer power by using resonance of an electric field or a magnetic field.

[Non-patent Document 1] Marin Soljacic, Aristeidis Karalis, John Joannopoulos, Andre Kurs, Robert Moffatt, and Peter Fisher. "Technology to transfer power by radio developed, 60-W bulb turned on in experiment." Nikkei Electronics 12-3 2007. pp. 117-128.

SUMMARY OF THE INVENTION

In a power transfer system that transfers power in a non-contact manner, user convenience is increased as a power transmission device becomes increasingly capable of transferring still larger power to a power receiving device at still greater distances.

However, as the power transmission device becomes increasingly capable of transferring still larger power to the power receiving device at still greater distances, in the power transfer system that transfers power in a non-contact manner, there is an increasing possibility that one power receiving device receives power from a plurality of power transmission devices. Since the power receiving device may receive more power than necessary in the above case, for example, there is a possibility that various kinds of faults such as heat generation and power receiving device failures are caused due to surplus power. Here, the possibility that various kinds of faults are caused in the power receiving device described above increases as it becomes possible to transfer still larger power for still greater distances.

When a power transfer system transfers power using resonance of a magnetic field (or an electric field), the power receiving device can receive power from the power transmission device having a still higher coupling coefficient. In the above case, however, with the presence of a magnetic field (or an electric field) having the same frequency and a different phase, transfer efficiency of power is lowered due to obstruction of a resonance operation by the other magnetic field (or the other electric field) in the power receiving device.

Therefore, if a plurality of power transmission devices is present in a power transfer system in related art, it is difficult to transfer power from one power transmission device to one power receiving device without being interfered by another power transmission device.

The present invention has been made in view of the above issue, and it is desirable to provide a new and improved power transmission device capable of transferring power, even if a plurality of power transmission devices is present, from one power transmission device to one power receiving device without being interfered by other power transmission devices, a power transmission method, a program, a power receiving device, and a power transfer system.

According to an embodiment of the present invention, there is provided a power transmission device including a communication part that performs communication with an external power transmission device that transmits power, a power transmission part that transmits power to a power receiving device that receives the transmitted power in a non-contact manner, a determination part that determines whether power can be transmitted, based on external power transmission information received by the communication part indicating a start of power transmission by the external power transmission device, and a power transmission control part that controls the power transmission part to selectively transmit power based on a determination result from the determination part.

With such a configuration, even if a plurality of power transmission devices is present, power can be transmitted from one power transmission device to one power receiving device without being interfered by other power transmission devices.

The determination part may determine that power is not capable of transmitting if the communication part receives the external power transmission information in a predetermined first reception period and the determination part may determine that power is capable of transmitting if the communication part does not receive the external power transmission information in the first reception period.

When the power transmission control part controls the power transmission part to transmit power, the determination part may determine that power is not capable of transmitting if the communication part receives the external power transmission information in a second reception period, which is longer than the first reception period and the determination part may determine that power is capable of transmitting if the communication part does not receive the external power transmission information in the second reception period.

The power transmission device may further include a power transmission information transmission control part that controls the communication part to selectively transmit power transmission information for a notification of starting power transmission based on the determination result from the determination part.

When the power transmission information transmission control part controls the communication part to transmit the power transmission information, the power transmission information transmission control part controls the communication part to transmit the power transmission information for a predetermined period until the power transmission part terminate power transmission.

The power transmission control part may control power to be transmitted from the power transmission part to the power receiving device in each predetermined period being divided into a plurality of divided periods.

The determination part may determine a blank divided period in which the external power transmission device does not transmit power, based on the received external power transmission information.

The power transmission part may transmit power using one or more power transmission channels and the determination part may determine whether power is capable of transmitting for each of the power transmission channels based on external power transmission information containing information of the power transmission channels for power transmission.

According to the embodiments of the present invention described above, there is provided a power transmission method, including the steps of: receiving external power transmission information transmitted from an external power transmission device indicating a start of power transmission by the external power transmission device to transmit power, in a predetermined reception period; determining whether power can be transmitted based on the external power transmission information received at the receiving step; and transmitting power selectively based on a determination result at the determining step.

By using such a method, even if a plurality of power transmission devices is present, power can be transmitted from one power transmission device to one power receiving device without being interfered by other power transmission devices.

According to the embodiments of the present invention described above, there is provided a program causing a computer to execute the steps of: receiving external power transmission information transmitted from an external power transmission device indicating a start of power transmission by the external power transmission device to transmit power, in a predetermined reception period; determining whether power can be transmitted based on the external power transmission information received at the receiving step; and transmitting power selectively based on a determination result at the determining step.

With such a program, even if a plurality of power transmission devices is present, power can be transmitted from one power transmission device to one power receiving device without being interfered by other power transmission devices.

According to the embodiments of the present invention described above, there is provided a power receiving device, including a receiving-side communication part that communicates with one or more power transmission devices that transmit power, a power receiving part that receives power transmitted from the power transmission device in a non-contact manner, a received power level detection part that outputs a detection result in accordance with a received power level, based on first transmission power transmitted from the power transmission device, the first transmission power increasing discretely, a received power information derivation part that derives information of power reception specifying a status relating to transmission power to the power transmission device based on a detection result from the received power level detection part, for each of the power transmission devices, and a power transmission device selection part that selects the power transmission device based on the derived information of power reception and causes the receiving-side communication part to transmit a power transmission request for requesting the selected power transmission device to transmit power.

With such a configuration, even if a plurality of power transmission devices is present, power can be transmitted from one power transmission device to one power receiving device without being interfered by other power transmission devices.

The power transmission device selection part may derive a coupling coefficient to the power transmission device as information of the power reception.

According to the embodiments of the present invention described above, there is provided a power transfer system, including a plurality of power transmission devices that transmit power and a power receiving device that receives power transmitted from the power transmission devices, wherein each of the power transmission devices, including a communication part that communicates with another power transmission device, a power transmission part that transmits power to the power receiving device in a non-contact manner, a determination part that determines whether power can be transmitted based on external power transmission information received by the communication part indicating a start of power transmission by the external power transmission device, and a power transmission control part that controls the power transmission part to selectively transmit power based on a determination result from the determination part.

With such a configuration, even if a plurality of power transmission devices is present, a power transfer system capable of transferring power from one power transmission device to one power receiving device without being interfered by other power transmission devices is realized.

According to the embodiments of the present invention described above, even if a plurality of power transmission devices is present, power can be transferred from one power transmission device to one power receiving device without being interfered by other power transmission devices.

BRIEF DESCRIPTION OF THE DRAWINGS

FIG. 12 is an explanatory view exemplifying a configuration of the power transfer system according to the first embodiment of the present invention.

DETAILED DESCRIPTION OF THE PREFERRED EMBODIMENTS

Figure 1:
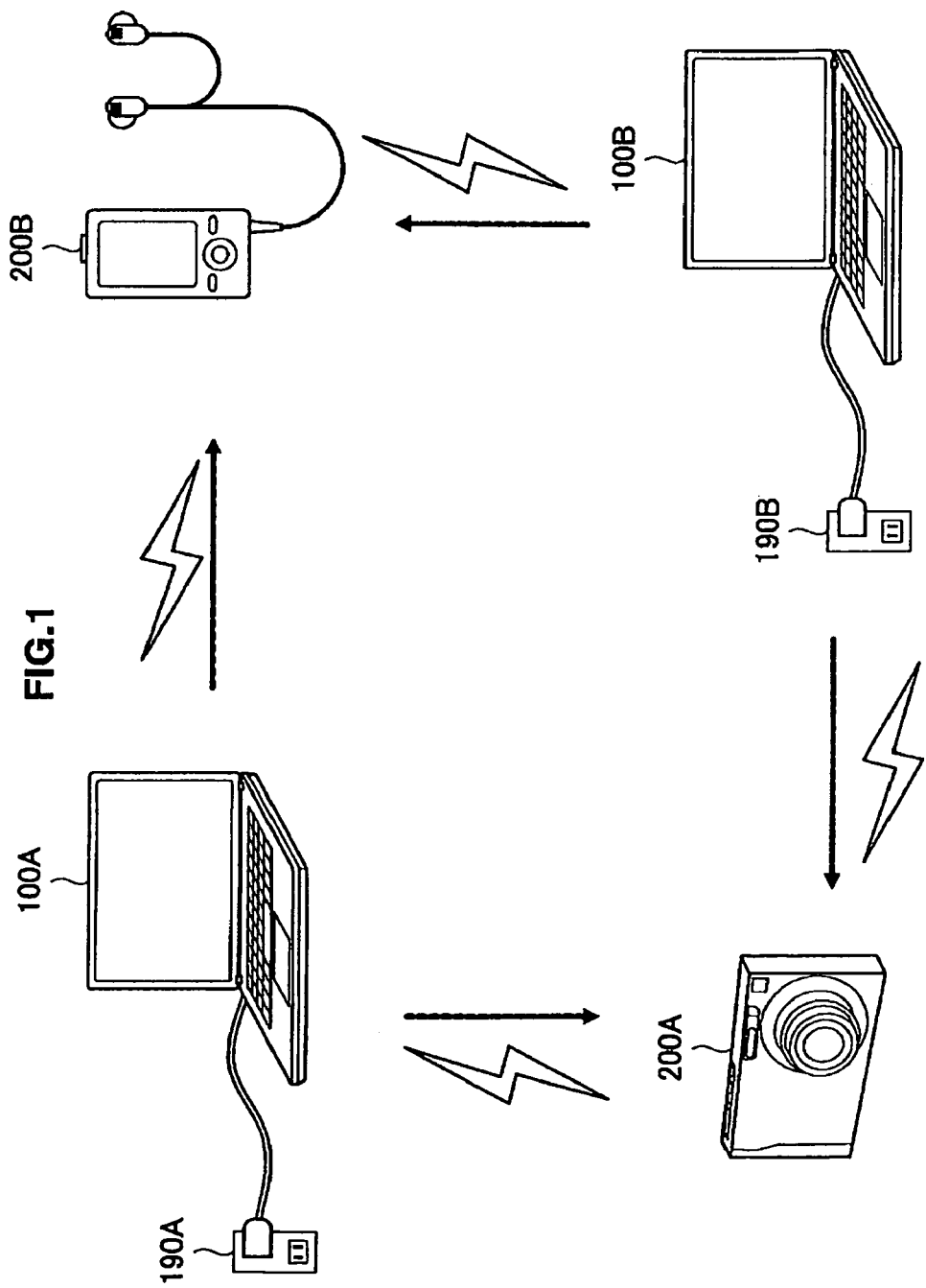
FIG. 1 is an explanatory view showing an overview of a power transfer system according to an embodiment of the present invention.

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

(Power Transfer System According to an Embodiment of the Present Invention)

FIG. 1 is an explanatory view showing an overview of a power transfer system 1000 according to an embodiment of the present invention. Referring to FIG. 1, the power transfer system 1000 has power transmission devices 100A and 100B that transmit power and power receiving devices 200A and 200B that receive power transmitted by the power transmission devices 100A and 100B in a non-contact manner (by radio). Here, an example in which the power transmission device 100A has power transmitted from outside via an outlet 190A and the power transmission device 100B has power transmitted from outside via an outlet 190B is shown in FIG. 1, but an embodiment is not limited to the above example. Hereinafter, the power transmission devices 100A and 100B may generically be called a "power transmission device 100" and the power receiving devices 200A and 200B may generically be called a "power receiving device 200". Incidentally, it is needless to say that the number of the power transmission devices 100 and that of the power receiving devices 200 constituting the power transfer system according to an embodiment of the present invention is not each limited to two.

As shown in FIG. 1, the two power transmission devices 100 can each transmit power to the power receiving devices 200 in the power transfer system 1000. In a power transfer system in related art, as described above, when one power receiving device receives power from each of two power transmission devices, the power receiving device may receive power that is more than necessary. In the above case, various kinds of faults such as heat generation and power receiving device failures may be caused due to surplus power in a power receiving device in related art. Even if a power transmission device in related art transmits power by using resonance of a magnetic field (or an electric field), as described above, there is a possibility that transfer efficiency of power is lowered due to obstruction of a resonance operation in a power receiving device in related art by a magnetic field (or an electric field) generated another power transmission device.

The power transfer system 1000 according to an embodiment of the present invention attempts to prevent an occurrence of the above issues. The power transfer system 1000 capable of preventing an occurrence of the above issues will be described by showing a power transfer system according to the first embodiment (hereinafter, referred to as a "power transfer system 1100") and a power transfer system according to the second embodiment (hereinafter, referred to as a "power transfer system 1200").

(The Power Transfer System 1100 According to the First Embodiment)

In the power transfer system 1100 according to the first embodiment, each of the power transmission devices 100 selectively transmits power using a result of communication between the power transmission devices 100 (some power transmission device and another power transmission device) to prevent an occurrence of the above issues in the power receiving devices 200. Before describing the configuration of the power transfer system 1100, a power transfer approach in the power transfer system 1100 will first be described.

[Power Transfer Approach According to the First Embodiment]

[1]. First Power Transfer Approach

[Overview of Processing in the Power Transmission Device 100]

Figure 2:
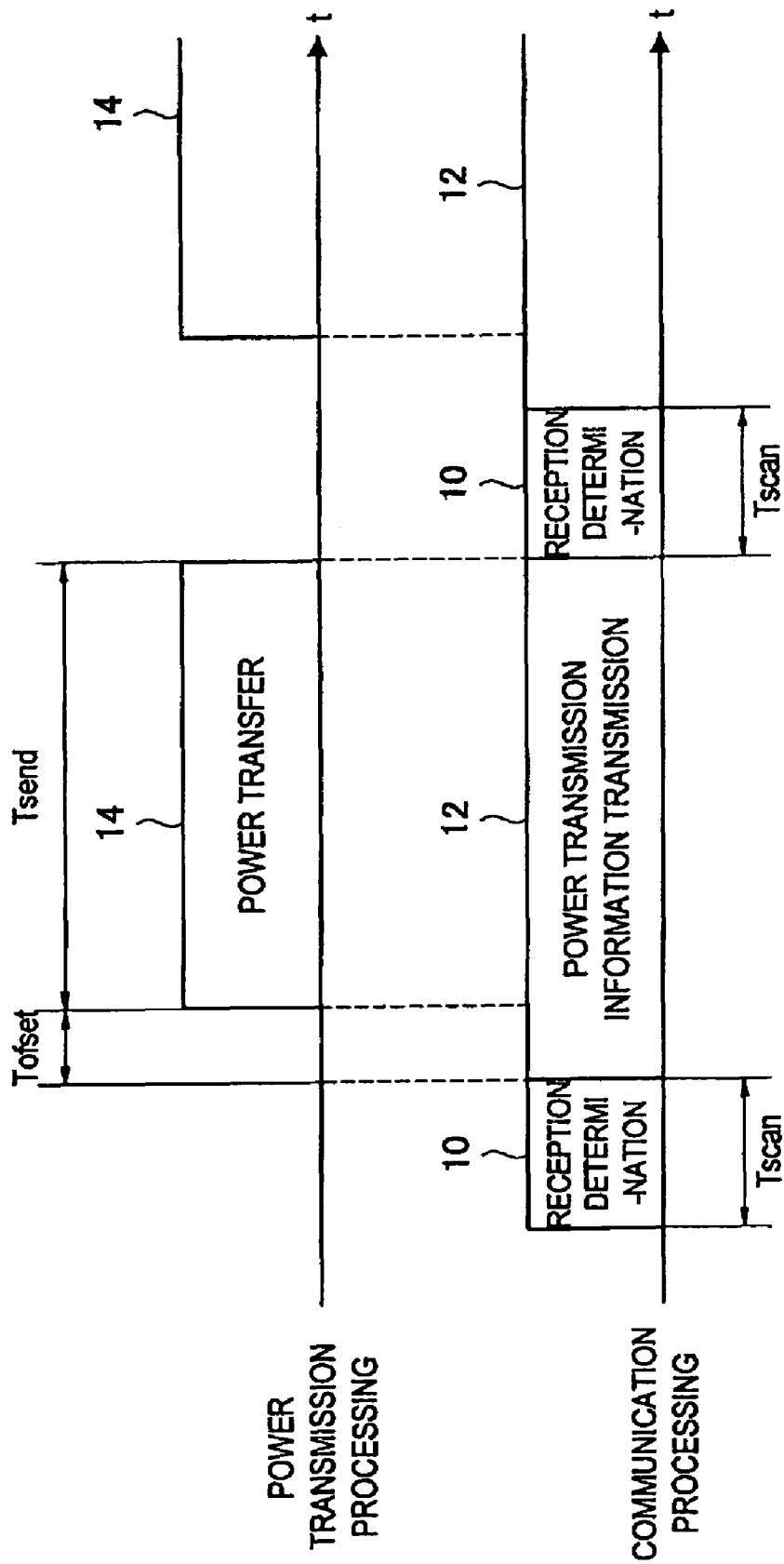
FIG. 2 is an explanatory view illustrating a first power transfer approach in the power transfer system according to a first embodiment of the present invention.

FIG. 2 is an explanatory view illustrating a first power transfer approach in the power transfer system 1100 according to the first embodiment of the present invention. Here, FIG. 2 shows a relationship between power transmission processing (power transfer processing) and communication processing in one power transmission device 100 constituting the power transfer system 1100.

[1-1] Reception Determination Processing

The power transmission device 100 performs reception determination processing 10 in a predetermined period Tscan (hereinafter, referred to as a "first reception period Tscan"). The reception determination processing 10 is processing to determine whether power can be transmitted based on external power transmission information transmitted from the other power transmission device 100 (an external device that transmits power, which, hereinafter, may be referred to as an "external power transmission device").

More specifically, if external power transmission information is received in the first reception period Tscan, the power transmission device 100 checks whether the external power transmission device will transmit power to the power receiving device 200 based on the external power transmission information. Then, if it is confirmed that the external power transmission device corresponding to the external power transmission information will transmit power to the power receiving device 200, the power transmission device 100 determines that power is not capable of transmitting to the power receiving device 200. If no external power transmission information is received in the first reception period Tscan, the power transmission device 100 determines that power can be transmitted to the power receiving device 200.

Here, the external power transmission information used by the power transmission device 100 for reception determination processing is information indicating the start of power transmission by the external power transmission device. The external power transmission information transmitted from the external power transmission device is information corresponding to power transmission information (described later) transmitted by the power transmission device 100 (That is, the power transmission information when viewed by the external power transmission device corresponds to the external power transmission information). Thus, a configuration example of the external power transmission information will be shown in the power transmission information described later.

[1-2] Power Transmission Information Transmission Processing

If it is determined in [1-1] described above that power can be transmitted to the power receiving device 200, the power transmission device 100 performs power transmission information transmission processing 12 to transmit power transmission information in a predetermined period (Tofset+Tsend). Here, the power transmission information is information to notify the external power transmission device of the start of power transmission.

Figure 3:
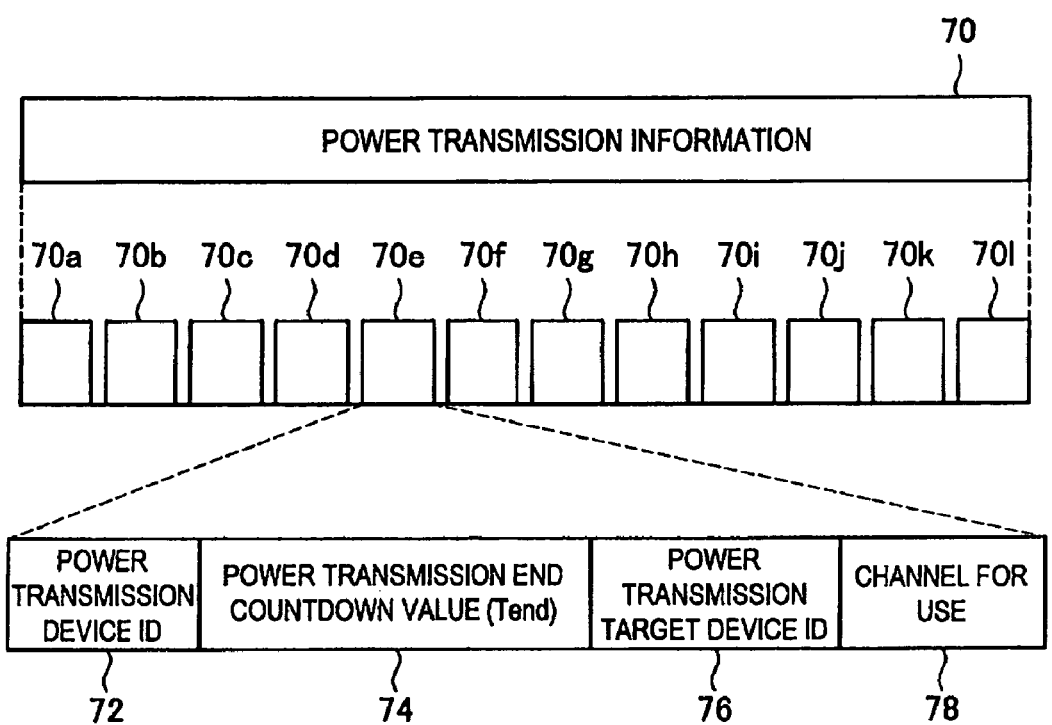
FIG. 3 is an explanatory view exemplifying power transmission information used by the first power transfer approach in the power transfer system according to the first embodiment of the present invention.

FIG. 3 is an explanatory view exemplifying power transmission information 70 used by the first power transfer approach in the power transfer system 1100 according to the first embodiment of the present invention. The external power transmission information can take, as described above, the same configuration as that of the power transmission information shown in FIG. 3.

Referring to FIG. 3, the power transmission information 70 includes a plurality of pieces of division transmission information 70a to 70l. Each piece of the division transmission information 70a to 70l has a power transmission device ID 72, a power transmission end count-down value 74 (Tend), a power transmission target device ID 76, and a channel for use 78.

The power transmission device ID 72 is identification information to identify the power transmission device 100. For example, a MAC address (Media Access Control address) can be cited as the power transmission device ID 72, but is not limited to this.

The power transmission end count-down value 74 is information to notify the external power transmission device of completion of the power transmission information transmission processing. As the power transmission end count-down value 74, a value that decrements by 1 by each piece of the division transmission information 70a to 70l so that the value in the division transmission information 70l becomes 0 can be adopted.

The power transmission target device ID 76 is information that the power transmission device 100 notifies the external power transmission device of the power receiving device 200 to which power is transmitted. Here, for example, identification information to identify the power receiving device 200 such as the MAC address can be cited as the power transmission target device ID 76, but the power transmission target device ID 76 is not limited to the above example.

The channel for use 78 is information that the power transmission device 100 notifies the external power transmission device of a power transmission channel for transmitting power. Here, for example, a carrier frequency to transmit power can be cited as the channel for use 78.

By transmitting, for example, the power transmission information 70 in the configuration shown in FIG. 3, the power transmission device 100 can notify the external power transmission device of transmission power to the power receiving device 200 and timing of completion of power transmission. While FIG. 3 shows an example in which the power transmission information 70 includes 12 pieces of division transmission information, it is needless to say that power transmission information according to an embodiment of the present invention is not limited to the above example.

[1-3] Power Transfer Processing

When power transmission information is transmitted in [1-2] described above, the power transmission device 100 starts transmission processing of power (power transfer processing 14) to the power receiving device 200 indicated by the power transmission information after a predetermined standby period Tofset passes. Here, the reason why the power transmission device 100 starts transmission power after the predetermined standby period Tofset passes is to ensure a time to perform the reception determination processing shown in [1-1] described above for the external power transmission device and to further reduce the possibility of power being transmitted from a plurality of the power transmission devices 100 to one power receiving device 200.

The power transmission device 100 performs the processing (power transmission information transmission processing) in [1-2] and the processing (power transfer processing) in [1-3] described above so that completion of power transmission and that of power transmission information transmission are synchronized. By performing the processing in [1-2] and that in [1-3] described above in the manner described above, the power transmission device 100 can further reduce the possibility that power is transmitted by the plurality of the power transmission devices 100 to one power receiving device 200.

When the processing (power transmission information transmission processing) in [1-2] and the processing (power transfer processing) in [1-3] described above are completed, the power transmission device 100 repeats the processing (reception determination processing) in [1-1] described above. If the power transmission device 100 determines in the processing in [1-1] described above that power is not capable of transmitting, the power transmission device 100 can perform the processing in [1-1] described above again based on the power transmission end count-down value contained in the external power transmission information after completion of power transmission by the external power transmission device.

When the power transmission device 100 determines that the external power transmission device will not transmit power to the power receiving device 200, the power transmission device 100 using the first power transfer approach transmits power to the power receiving device 200 by performing the processing [1-1] to [1-3] described above. Therefore, the power transmission device 100 using the first power transfer approach can transmit power, even if a plurality of the power transmission devices 100 is present, to one power receiving device 200 without being interfered by the other power transmission devices 100.

<Modification of the First Power Transfer Approach>

Figure 4:
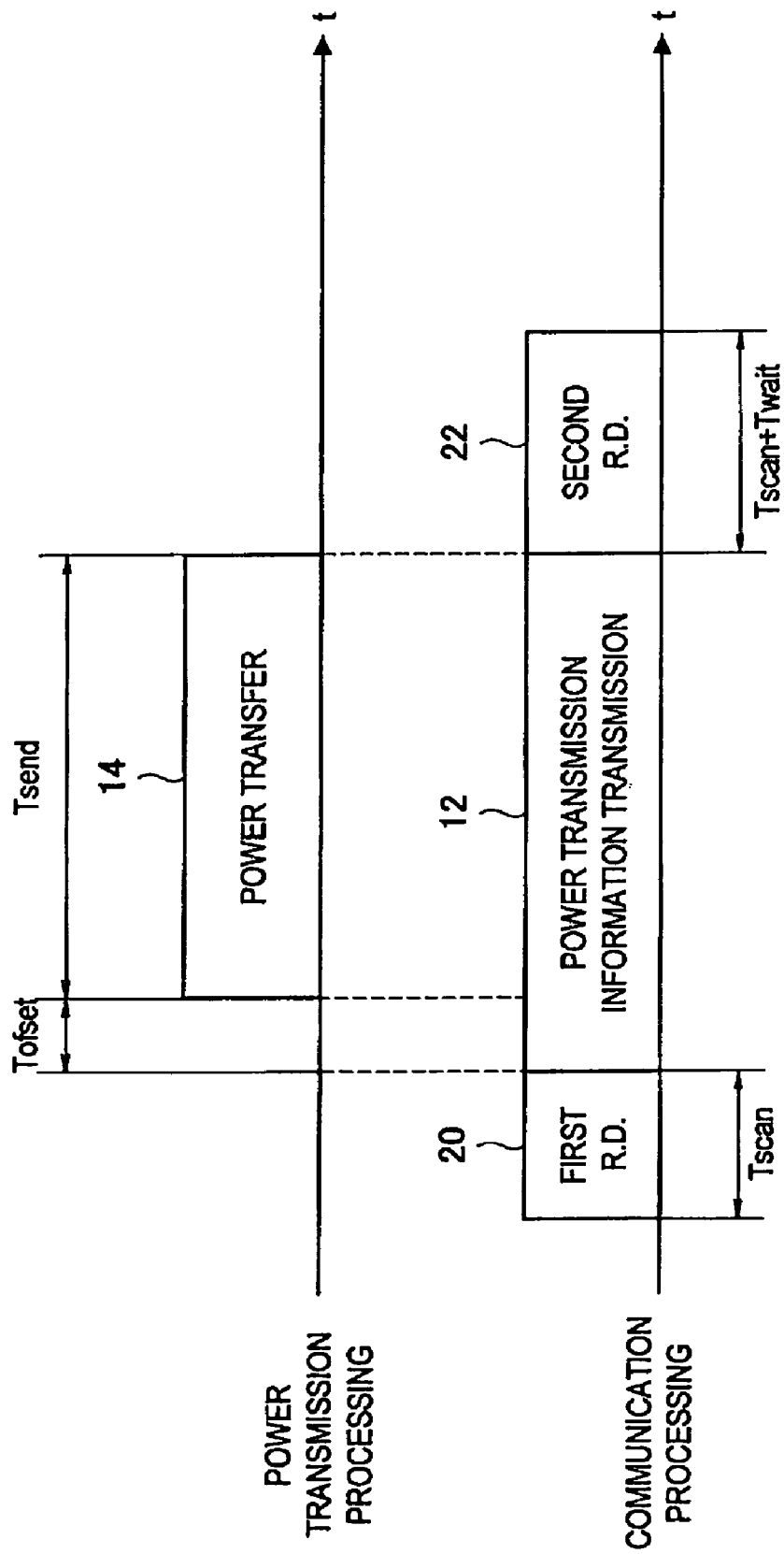
FIG. 4 is an explanatory view illustrating a modification of the first power transfer approach in the power transfer system according to the first embodiment of the present invention.

FIG. 4 is an explanatory view illustrating a modification of the first power transfer approach in the power transfer system 1100 according to the first embodiment of the present invention. Here, like FIG. 2, FIG. 4 shows a relationship between power transmission processing (power transfer processing) and communication processing in one power transmission device 100 constituting the power transfer system 1100.

Referring to FIG. 4, the power transmission device 100 using the modification of the first power transfer approach basically performs the same processing as the first power transfer approach shown in FIG. 2, reception determination processing after power being transmitted is different. More specifically, the power transmission device 100 using the modification of the first power transfer approach performs two pieces of reception determination processing, first reception determination processing 20 (hereinafter, may be referred to as an "FIRST R.D.") and second reception determination processing 22 (hereinafter, may be referred to as an "SECOND R.D.") performed after power being transmitted. Here, the first reception determination processing 20 is processing to perform the reception processing shown in [1-1] described above in a first reception period Tscan and is the same processing as the reception determination processing 10 shown in FIG. 2. The second reception determination processing 22 is processing to perform the reception processing shown in [1-1] described above in a predetermined period Tscan+Twait (hereinafter, referred to as a "second reception period Tscan+Twait").

Here, the meaning that the power transmission device 100 using the modification of the first power transfer approach performs the second reception determination processing 22 after power being transmitted will be described. In the power transfer system 1100, each of the power transmission devices 100 determines whether or not power is transmitted by the other power transmission device 100 (external power transmission device) and selectively transmits power by repeating, for example, the processing [1-1] to [1-3] described above. Here, if the period for performing the processing [1-1] described above is constant for each of the power transmission devices 100 in the power transfer system 1100, a case in which, for example, one power transmission device 100 continues to transmit power and the other power transmission device 100 (external power transmission device) does not transmit power may occur. Thus, in the modification of the first power transfer approach, if the power transmission device 100 continues to transmit power, the power transmission device 100 performs reception determination processing after power being transmitted in the second reception period Tscan+Twait, which is longer than the first reception period Tscan. If, as described above, the second reception determination processing 22 is performed by each of the power transmission devices 100 after power being transmitted, for example, a case in which one power transmission device 100 continues to transmit power and the other power transmission device 100 (external power transmission device) does not transmit power can be prevented.

Since the power transmission device 100 using the modification of the first power transfer approach performs basically the same processing as when the first power transfer approach is used, the same effect as that when the first power transfer approach is used can be achieved.

[Power Transmission Method in the Power Transmission Device 100]

Figure 5:
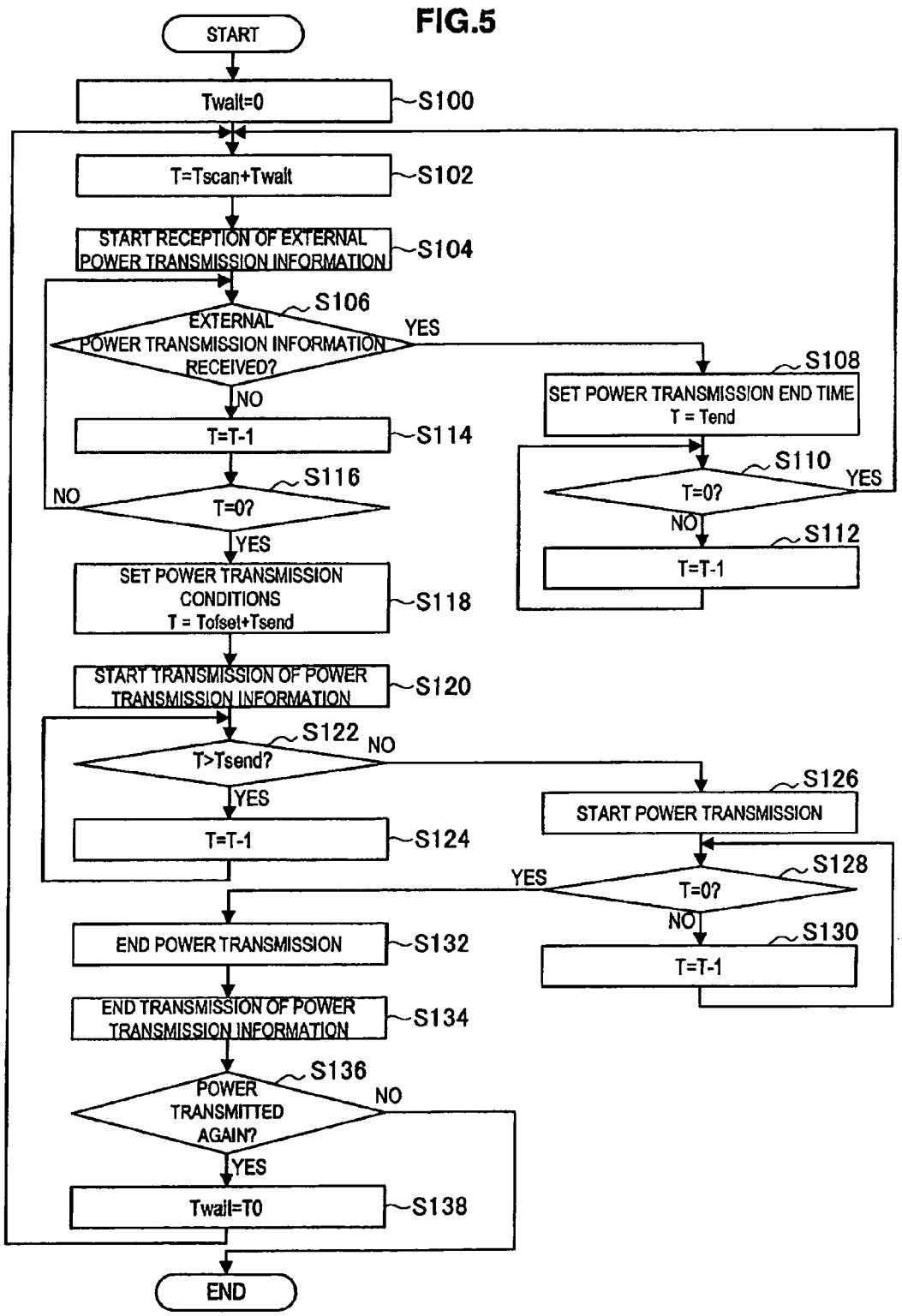
FIG. 5 is a flow chart exemplifying a power transmission method in a power transmission device using the first power transfer approach in the power transfer system according to the first embodiment of the present invention.

Next, the power transmission method in the power transmission device 100 using the first power transfer approach will be described. FIG. 5 is a flow chart exemplifying a power transmission method in the power transmission device 100 using the first power transfer approach in the power transfer system 1100 according to the first embodiment of the present invention. FIG. 5 shows a case in which the power transmission device 100 uses the modification of the first power transfer approach.

The power transmission device 100 initializes Twait (Twait=0) (S100). Then, the power transmission device 100 sets a setting time T as T=Tscan+Twait (S102). Here, the power transmission device 100 can set the setting time T set at step S102 to the first reception period Tscan by the processing at S100 being performed by the power transmission device 100. Thus, Twait described above plays the role of an adjustment time to adjust the reception period (Hereinafter, Twait will be called an "adjustment time Twait").

After the first reception period Tscan being set at step S102, the power transmission device 100 starts reception of external power transmission information (S104; start of reception determination processing). Then, the power transmission device 100 determines whether or not external power transmission information has been received (S106).

<If External Power Transmission Information is Received>

If external power transmission information is received at step S106, the power transmission device 100 sets the setting time T as T=Tend (S108). Here, the power transmission device 100 can set the setting time T to the power transmission end time indicating the time when the external power transmission device completes power transmission by the processing at step S108 being performed by the power transmission device 100.

After the power transmission end time being set at step S108, the power transmission device 100 determines whether or not T=0 (S110). If it is not determined at S110 that T=0, the power transmission device 100 sets T=T−1 (the so-called count-down) (S112). Then, the power transmission device 100 repeats processing at step S110 and thereafter.

If it is determined at S110 that T=0, the power transmission device 100 repeats processing at step S102 and thereafter.

<If External Power Transmission Information is not Received>

If external power transmission information is not received at step 106, the power transmission device 100 sets T=T−1 (the so-called count-down) (S114). Then, the power transmission device 100 determines whether or not T=0 (S116). If it is not determined at S116 that T=0, the power transmission device 100 repeats processing at step S106 and thereafter.

If it is determined at S116 that T=0, the power transmission device 100 sets the setting time T as T=Tofset+Tsend (S118). Here, the power transmission device 100 can set the setting time T to the power transmission information transmission time by the processing at step 118 being performed by the power transmission device 100. The processing at step S118 corresponds to settings of power transmission conditions.

After power transmission conditions being set at step S118, the power transmission device 100 starts transmission power transmission information (S120). Then, after transmission power transmission information is started at step S120, the power transmission device 100 determines whether or not T>Tsend (S122). Here, the processing at step S122 corresponds to a determination of progress of the standby period Tofset.

If it is determined at step S122 that T>Tsend (that is, determined that the standby period Tofset has not passed), the power transmission device 100 sets T=T−1 (the so-called count-down) (S124). Then, the power transmission device 100 repeats processing at step S122 and thereafter.

If it is not determined at step S122 that T>Tsend (that is, determined that the standby period Tofset has passed), the power transmission device 100 starts transmission power (S126).

After transmission power is started at step S126, the power transmission device 100 determines whether or not T=0 (S128). If it is not determined at S128 that T=0, the power transmission device 100 sets T=T−1 (the so-called count-down) (S130). Then, the power transmission device 100 repeats processing at step S128 and thereafter.

If it is determined at S128 that T=0, the power transmission device 100 ends transmission power (S132). The power transmission device 100 also ends transmission power transmission information (S134).

While FIG. 5 shows an example in which the processing at step S134 is performed after the processing at step S132, the processing at step S132 and the processing at step S134 can be performed independently. Therefore, for example, the power transmission device 100 can perform the processing at step S132 and the processing at step S134 simultaneously or the processing at step S132 after the processing at step S134.

After transmission power transmission information being finished at step S134, the power transmission device 100 determines whether or not power will be transmitted again (S136). Here, the power transmission device 100 can make a determination at step S136 based on, for example, power request information requesting transmission power transmitted from each of the power receiving devices 200, but the determination is not limited to the above example.

If it is not determined at step S136 that power will be transmitted again, the power transmission device 100 terminates processing.

If it is determined at step S136 that power will be transmitted again, the power transmission device 100 sets the adjustment time Twait as Twait=T0 (T0>0) (S138) and repeats processing at step S102 and thereafter. Here, the power transmission device 100 can set the setting time T set at step S102 to the second reception period Tscan+Twait by the processing at step S138 being performed by the power transmission device 100.

The power transmission device 100 using the first power transfer approach performs the processing (reception determination processing) in [1-1], the processing (power transmission information transmission processing) in [1-2] and the processing (power transfer processing) in [1-3] described above by using, for example, the power transmission method shown in FIG. 5. Therefore, the power transmission device 100 using the first power transfer approach can transmit power, even if a plurality of the power transmission devices 100 is present, to one power receiving device 200 without being interfered by the other power transmission devices 100.

[Example of Power Transfer in the First Power Transfer Approach]

In the power transfer system 1100 in which the first power transfer approach is used, each of the power transmission devices 100 performs the processing shown in FIG. 5. Here, an example of power transfer in the power transfer system 1100 in which the first power transfer approach is used will be shown.

Figure 6:
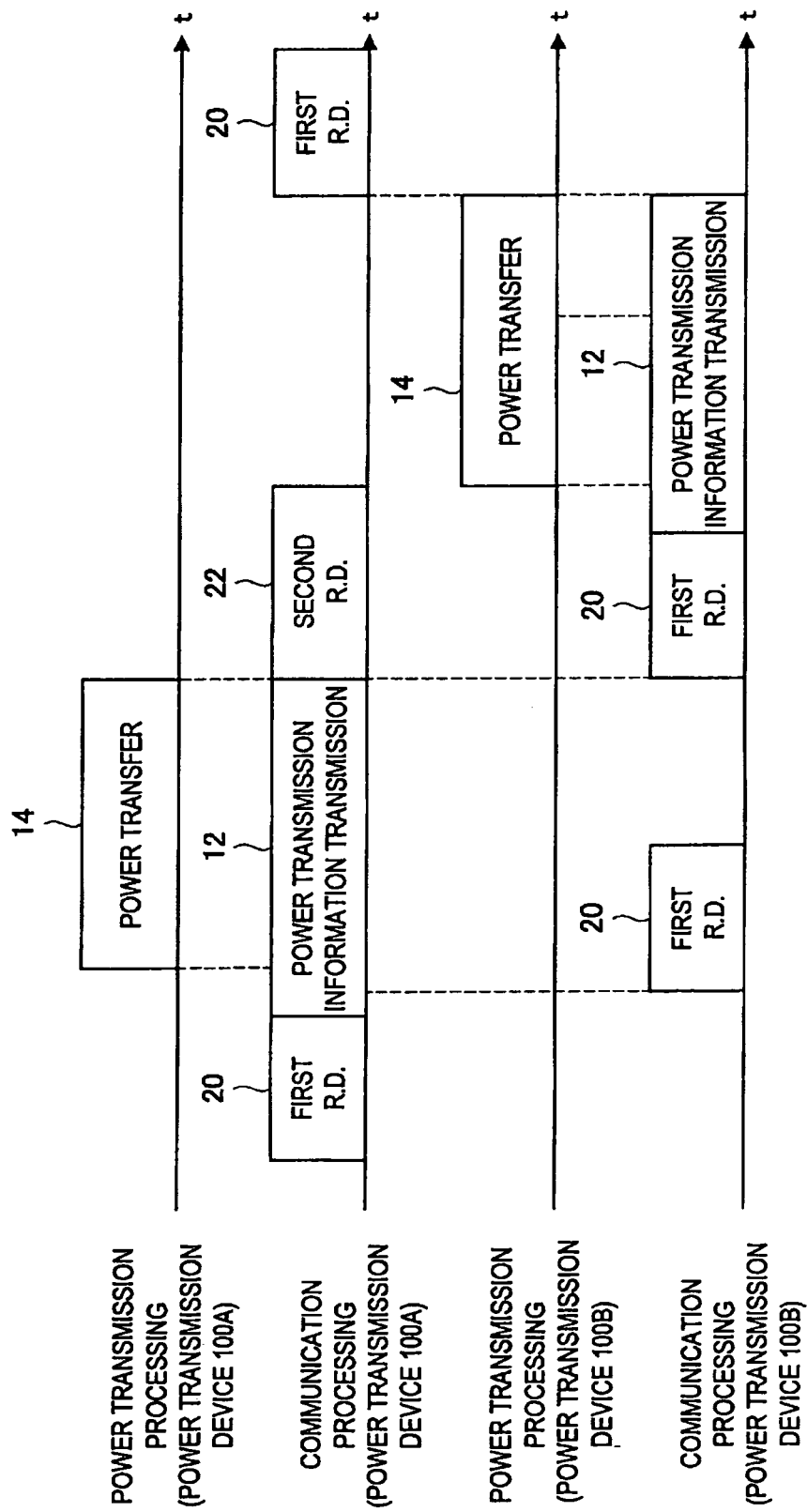
FIG. 6 is an explanatory view exemplifying power transfer in the power transfer system according to the first embodiment in which the first power transfer approach of the present invention is used.

FIG. 6 is an explanatory view exemplifying power transfer in the power transfer system 1100 according to the first embodiment in which the first power transfer approach of the present invention is used. FIG. 6 shows communication processing and power transmission processing (power transfer processing) for each of the power transmission device 100A and the power transmission device 100B shown in FIG. 1.

Referring to FIG. 6, it is clear that each of the power transmission device 100A and the power transmission device 100B performs the processing (reception determination processing) in [1-1] to the processing (power transfer processing) in [1-3] described above. As shown in FIG. 6, in the power transfer system 1100 using the first power transfer approach, when one of the power transmission device 100A and the power transmission device 100B transmits power, the other power transmission device does not transmit power. Therefore, the power transfer system 1100 using the first power transfer approach can transmit power, even if a plurality of power transmission devices is present, from one power transmission device to one power receiving device without being interfered by other power transmission devices.

[2] Second Power Transfer Approach

Figure 7:
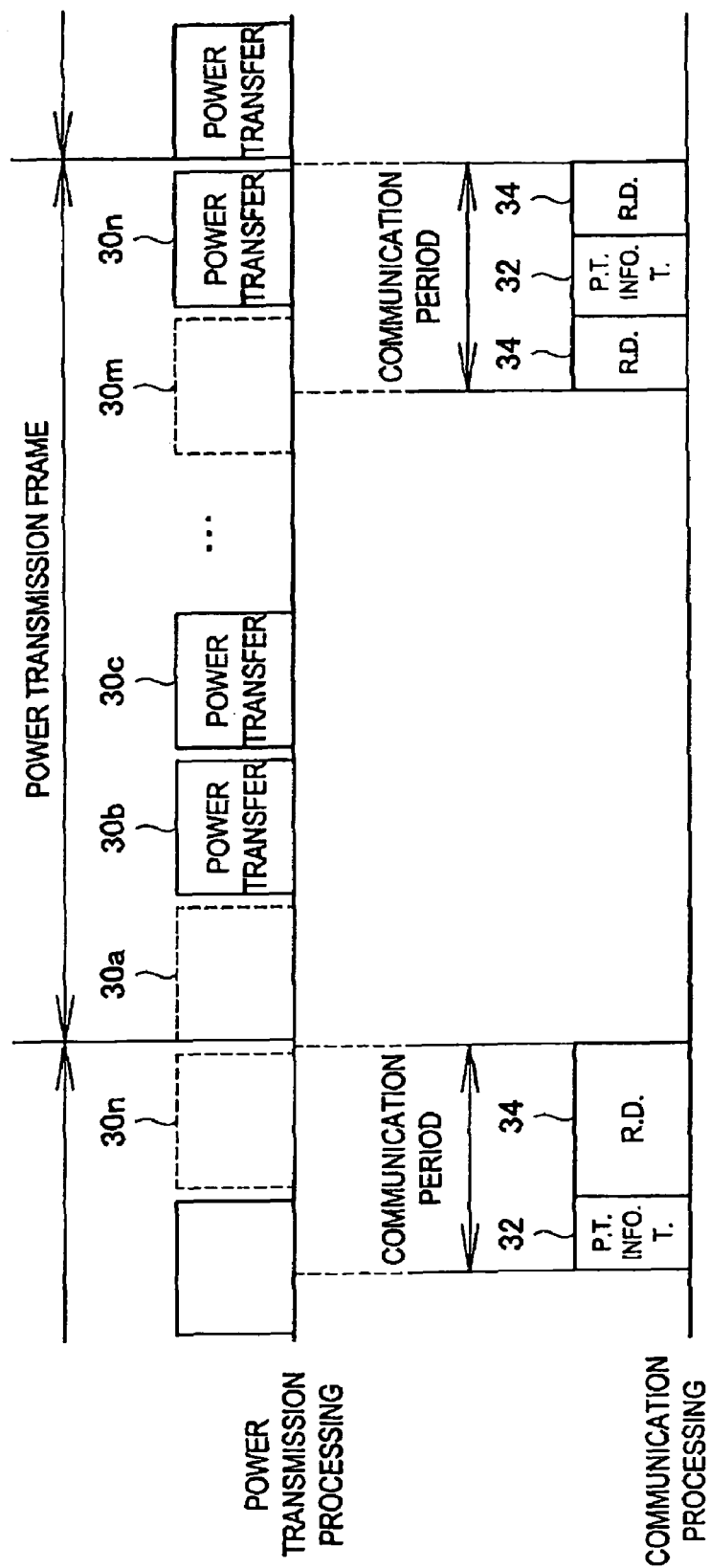
FIG. 7 is an explanatory view illustrating a second power transfer approach in the power transfer system according to the first embodiment of the present invention.

Next, the second power transfer approach in the power transfer system 1100 according to the first embodiment of the present invention will be described. FIG. 7 is an explanatory view illustrating the second power transfer approach in the power transfer system 1100 according to the first embodiment of the present invention. Here, FIG. 7 shows a relationship between power transmission processing (power transfer processing) and communication processing in one power transmission device 100 constituting the power transfer system 1100.

As shown in FIG. 7, the power transmission device 100 using the second power transfer approach divides power transmission processing for each predetermined period (hereinafter, referred to as a "power transmission frame"). The power transmission device 100 divides each power transmission frame into a plurality of divided periods (hereinafter, referred to as "power transmission slots"). Here, FIG. 7 shows an example in which a power transmission frame includes 14 power transmission slots, but the number of power transmission slots is not limited to 14.

Like the first power transfer approach, the power transmission device 100 using the second power transfer approach performs communication with the external power transmission device (the other power transmission device 100) before transmitting power and then, transmits power based on a result of the communication. An overview of processing by the power transmission device 100 using the second power transfer approach will be described below.

[Overview Processing by the Power Transmission Device 100]

[2-1] Communication Processing

The power transmission device 100 performs communication processing such as power transmission information transmission processing and reception determination processing in a predetermined period (hereinafter, referred to as a "communication period") before starting a power transmission frame. In FIG. 7 shows, for example, an example in which the power transmission device 100 performs power transmission information transmission processing 32 (hereinafter, may be referred to as an "P.T.INFO.T.") and reception determination processing 34 (hereinafter, may be referred to as an "R.D.") in the communication period.

Figure 8:
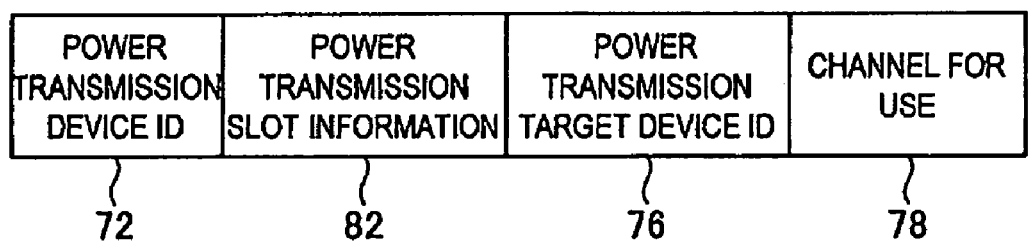
FIG. 8 is an explanatory view exemplifying power transmission information used by the second power transfer approach in the power transfer system according to the first embodiment of the present invention.

The power transmission information transmission processing 32 is processing to transmit power transmission information including information such as in which power transmission slot the power transmission device 100 transmits power to the external power transmission device. FIG. 8 is an explanatory view exemplifying power transmission information 80 used by the second power transfer approach in the power transfer system 1100 according to the first embodiment of the present invention.

Referring to FIG. 8, the power transmission information 80 includes a power transmission device ID 72, power transmission slot information 82, a power transmission target device ID 76, and a channel for use 78. Here, the power transmission device ID 72, the power transmission target device ID 76, and the channel for use 78 are each information similar to the power transmission information 70 used by the first power transfer approach in FIG. 3. The power transmission slot information 82 is information to notify the external power transmission device of the power transmission slot used by the power transmission device 100 to transmit power. The power transmission slot information 82 may be, for example, information indicating the power transmission slot used to transmit power in bitmap format, but is not limited to the above example.

The power transmission device 100 can notify the external power transmission device of the power transmission slot used to transmit power, for example, by performing the power transmission information transmission processing 32 to transmit the power transmission information 80 shown in FIG. 8. Power transmission information according to the second power transfer approach is not limited to the configuration shown in FIG. 8 and may contain, for example, information such as the power transmission frame number. The power transmission information 80 transmitted by some power transmission device 100 corresponds to external power transmission information when viewed from the other power transmission devices 100.

The reception determination processing 34 is processing for the power transmission device 100 to receive external power transmission information transmitted from the external power transmission device. Here, the external power transmission information may have a configuration similar to that of the power transmission information 80 shown in FIG. 8. Therefore, the power transmission device 100 can grasp which power transmission slot the external power transmission device uses to transmit power.

In the processing in [2-1], as described above, each of the power transmission devices 100 constituting the power transfer system 1100 transmits power transmission information and receives external power transmission information transmitted from the other power transmission devices 100 (external power transmission device). Therefore, each of the power transmission devices 100 can grasp which power transmission slot the other power transmission devices 100 (external power transmission device) uses to transmit power.

[2-2] Assignment Processing

The power transmission device 100 performs assignment processing to set power transmission slot used to transmit power based on external power transmission information received in the processing in [2-1] described above and transmitted power transmission information. More specifically, the power transmission device 100 determines the power transmission slot (the power transmission slot indicating the start of transmission) desired by the external power transmission device to be used to transmit power based on received external power transmission information. Then, the power transmission device 100 sets a power transmission slot used to transmit power in such a way that the power transmission slot does not overlap with that used by the external power transmission device by combining a determination result based on the external power transmission information and information of the power transmission slot specified in the power transmission information.

Here, if assignment processing is performed based on power transmission information and received external power transmission information, some power transmission slot may be desired by a plurality of the power transmission devices 100 to be used to transmit power. Thus, in the second power transfer approach, some power transmission slot can be prevented from being used by the plurality of the power transmission devices 100 to transmit power, for example, by performing assignment processing using means shown in (a) to (c) below.

(a) First Prevention Means

The power transmission device 100 includes information of priority code specifying the priority for each power transmission slot desired for power transmission in power transmission information transmitted in the processing in [2-1] described above. Then, if the other power transmission device 100 (external power transmission device) desires a power transmission slot desired by each of the power transmission devices 100 for power transmission, each of the power transmission devices 100 determines whether power can be transmitted by the relevant power transmission slot based on information of the priority code. Here, information of the priority code includes, for example, information in which a three-cornered deadlock is established such as "janken" (for example, values "1", "2", and "3" to which a rule about priority is set in advance), but is not limited to the above example.

(b) Second Prevention Means

If the other power transmission device 100 (external power transmission device) desires a power transmission slot desired by the power transmission device 100 for power transmission, the power transmission device 100 determines whether power can be transmitted by the relevant power transmission slot based on the transmission time of power transmission information and the reception time of external power transmission information. If, for example, the transmission time of power transmission information is prior to the reception time of external power transmission information, the power transmission device 100 using the second prevention means determines that power can be transmitted by the power transmission slot, but the present embodiment is not limited to this.

(c) Third Prevention Means

If the other power transmission device 100 (external power transmission device) desires a power transmission slot desired by the power transmission device 100 for power transmission, the power transmission device 100 determines whether power can be transmitted by the relevant power transmission slot based on whether or not the power transmission frame number that secured a new power transmission slot (group) last time is the oldest (for example, the smallest).

The power transmission device 100 can prevent, for example, by performing assignment processing using the means shown in (a) to (c) described above, some power transmission slot from being used by the plurality of power transmission devices 100 to transmit power.

[2-3] Power Transfer Processing

Based on an assignment result of the processing in [2-2] described above based on the power transmission information and external power transmission information, the power transmission device 100 transmits power by the corresponding power transmission slot.

The power transmission device 100 using the second power transfer approach transmits power to some power receiving device 200 using the power transmission slot determined not to be used by the external power transmission device to transmit power to the power receiving device 200 by performing the processing (communication processing) in [2-1], the processing (assignment processing) in [2-2], and the processing (power transfer processing) [2-3] described above. Therefore, the power transmission device 100 using the second power transfer approach can transmit power, even if a plurality of power transmission devices 100 is present, to one power receiving device 200 without being interfered by the other power transmission devices 100.

[Example of Power Transfer in the Second Power Transfer Approach]

In the power transfer system 1100 in which the second power transfer approach is used, each of the power transmission devices 100 performs the processing in [2-1] to the processing in [2-3] described above. Here, an example of power transfer in the power transfer system 1100 in which the second power transfer approach is used will be shown.

Figure 9:
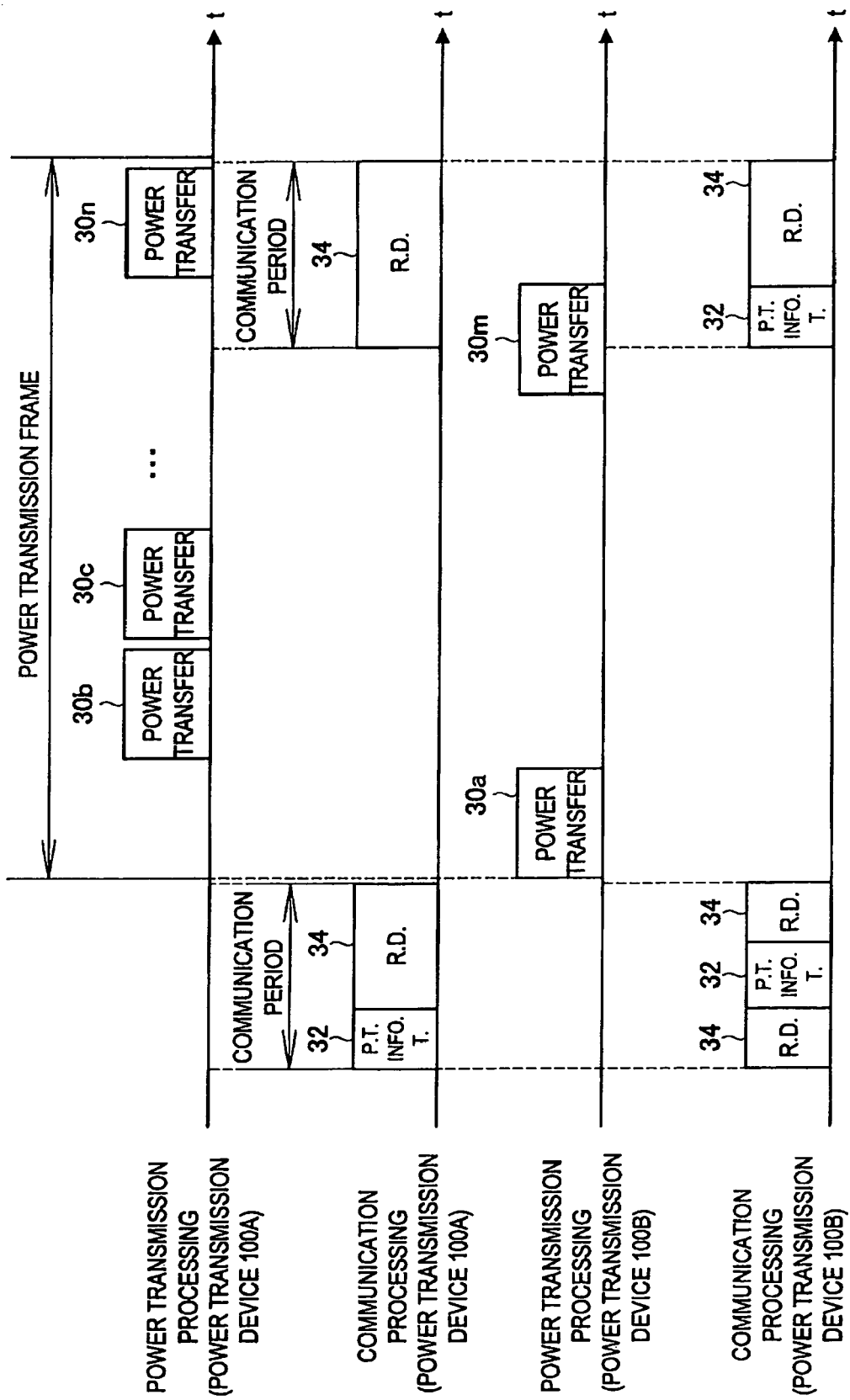
FIG. 9 is an explanatory view exemplifying power transfer in the power transfer system according to the first embodiment in which the second power transfer approach of the present invention is used.

FIG. 9 is an explanatory view exemplifying power transfer in the power transfer system 1100 according to the first embodiment in which the second power transfer approach of the present invention is used. FIG. 9 shows communication processing and power transmission processing (power transfer processing) in each of the power transmission device 100A and the power transmission device 100B shown in FIG. 1. Though FIG. 9 does not illustrate the processing (assignment processing) in [2-2] described above, the power transmission device 100A and the power transmission device 100B perform the processing in [2-2] described above in a time between the communication period and the power transmission frame.

Referring to FIG. 9, it is clear that each of the power transmission device 100A and the power transmission device 100B performs the processing (communication processing) in [2-1] and the processing (power transfer processing) [2-3] described above. As shown in FIG. 9, in the power transfer system 1100 using the second power transfer approach, when one of the power transmission device 100A and the power transmission device 100B transmits power by some power transmission slot, the other power transmission device does not transmit power. Therefore, the power transfer system 1100 using the second power transfer approach can transmit power, even if a plurality of power transmission devices is present, from one power transmission device to one power receiving device without being interfered by other power transmission devices.

[3] Third Power Transfer Approach

Figure 10:
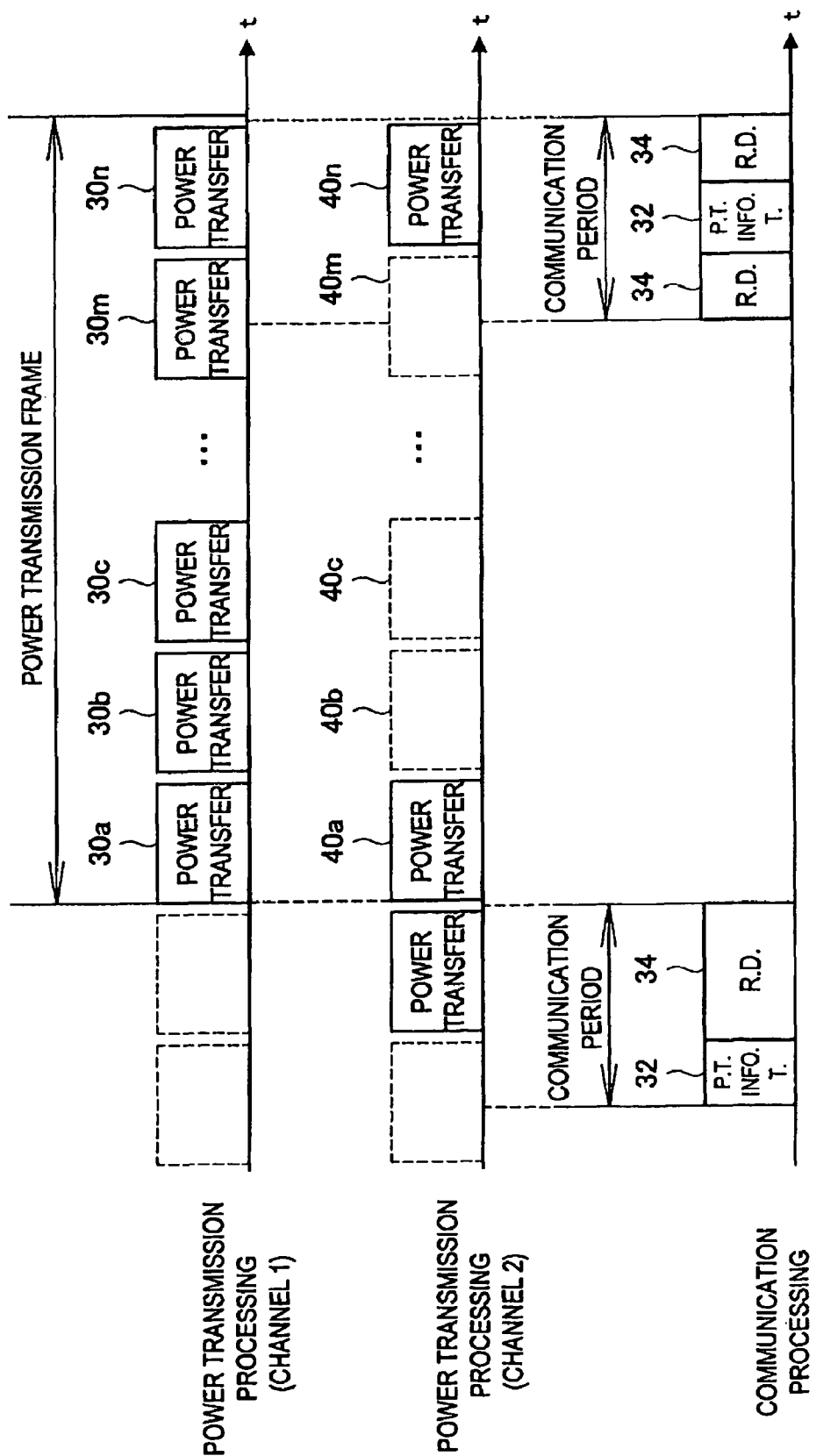
FIG. 10 is an explanatory view illustrating a third power transfer approach in the power transfer system according to the first embodiment of the present invention.

Next, the third power transfer approach in the power transfer system 1100 according to the first embodiment of the present invention will be described. FIG. 10 is an explanatory view illustrating the third power transfer approach in the power transfer system 1100 according to the first embodiment of the present invention. Here, FIG. 10 shows a relationship between power transmission processing (power transfer processing) and communication processing in one power transmission device 100 constituting the power transfer system 1100.

As shown in FIG. 10, the power transmission device 100 using the third power transfer approach transmits power by basically the same processing as the second power transfer approach described above, but is different in that a plurality of power transmission channels is used to transmit power. For example, when the power transfer system 1100 transmits power by using resonance of a magnetic field (or an electric field), power is not transmitted/received between a power transmission device and a power receiving device having different resonance frequencies. Thus, for example, as shown by a power transmission slot 30*a* and a power transmission slot 40*a* or a power transmission slot 30*n* and a power transmission slot 40*n* in FIG. 10, the power transmission device 100 can transmit power in the same period by using the plurality of power transmission channels. Therefore, the power transmission device 100 constituting the power transfer system 1100 can have a plurality of power transmission means that do not interfere with each other, for example, by using the plurality of power transmission channels for power transmission. Here, the plurality of power transmission channels in the third power transfer approach includes, for example, resonance frequencies that transmit power, but is not limited to the above example.

The power transmission device 100 using the third power transfer approach performs processing (communication processing) in [3-1], processing (assignment processing) in [3-2], and processing (power transfer processing) [3-3]. Here, the processing in [3-1] to the processing in [3-3] described above are basically the same as the processing in [2-1] to the processing in [2-3] described above according to the second power transfer approach respectively and processing is performed for each power transmission channel. That is, the power transmission device 100 using the third power transfer approach uses a power transmission slot determined not to be used by the external power transmission device to transmit power to some power receiving device 200 for each power transmission channel to transmit power to the power receiving device 200.

Therefore, the power transmission device 100 using the third power transfer approach can transmit power, even if a plurality of power transmission devices 100 is present, to one power receiving device 200 without being interfered by the other power transmission devices 100.

FIG. 10 shows that the power transmission device 100 using the third power transfer approach performs basically the same processing as the second power transfer approach described above, but the power transmission device 100 is not limited to the above example. For example, the power transmission device 100 using the third power transfer approach may perform the same processing as the first power transfer approach described above by using a plurality of power transmission channels.

[Example of Power Transfer in the Third Power Transfer Approach]

In the power transfer system 1100 in which the third power transfer approach is used, each of the power transmission devices 100 performs the processing [3-1] to the processing [3-3] described above. Here, an example of power transfer in the power transfer system 1100 in which the third power transfer approach is used will be shown.

Figure 11:
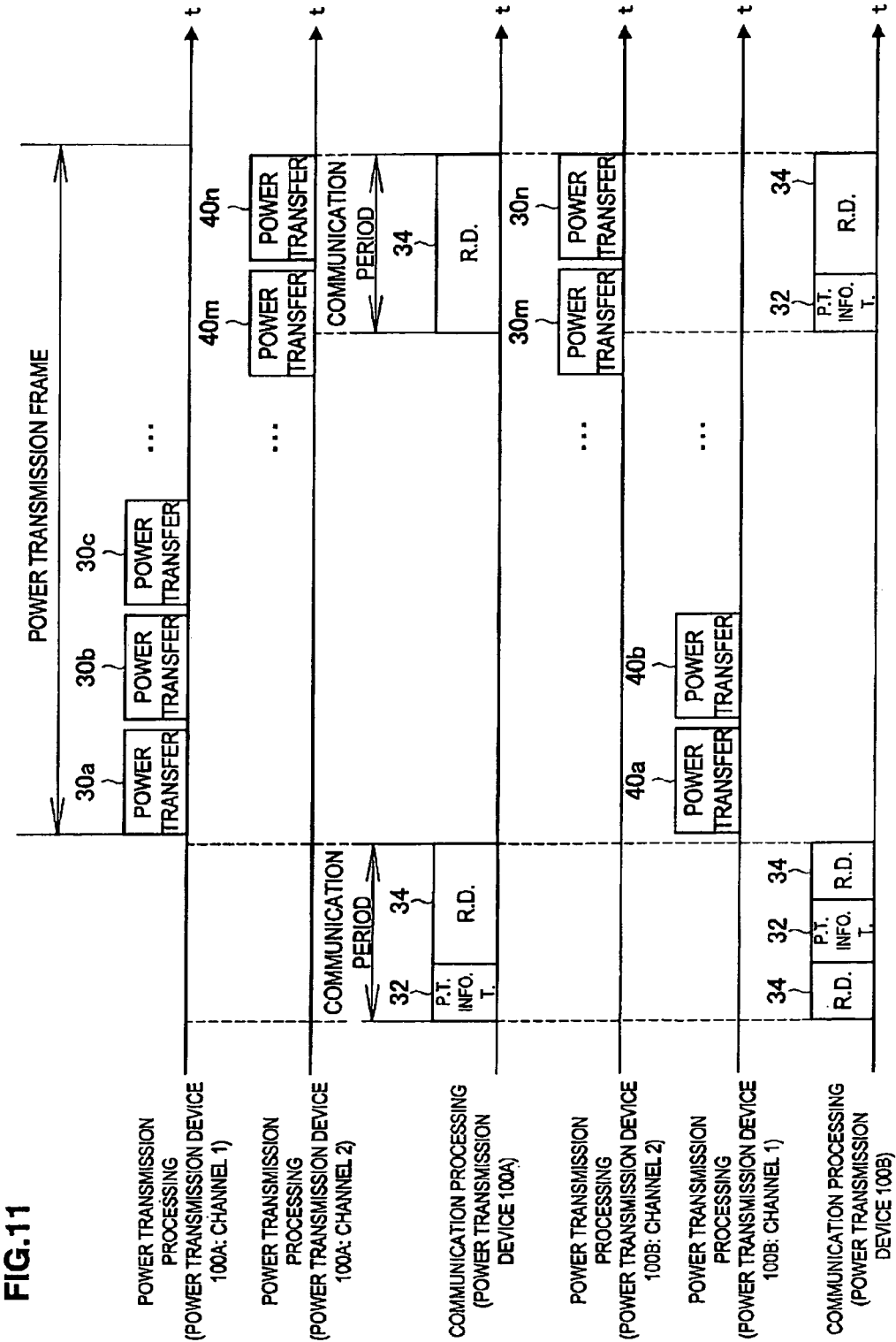
FIG. 11 is an explanatory view exemplifying power transfer in the power transfer system according to the first embodiment in which the third power transfer approach of the present invention is used.

FIG. 11 is an explanatory view exemplifying power transfer in the power transfer system 1100 according to the first embodiment in which the third power transfer approach of the present invention is used. FIG. 11 shows communication processing and power transmission processing (power transfer processing) in each of the power transmission device 100A and the power transmission device 100B shown in FIG. 1. Though FIG. 11 does not illustrate the processing (assignment processing) in [3-2] described above, the power transmission device 100A and the power transmission device 100B perform, like in FIG. 9, the processing in [3-2] described above in a time between the communication period and the power transmission frame.

Referring to FIG. 11, it is clear that in the power transfer system 1100 using the third power transfer approach, when one of the power transmission device 100A and the power transmission device 100B transmits power by some power transmission slot in each power transmission channel, the other power transmission device does not transmit power.

Therefore, the power transfer system 1100 using the third power transfer approach can transmit power, even if a plurality of power transmission devices is present, from one power transmission device to one power receiving device without being interfered by other power transmission devices.

In the power transfer system 1100 according to the first embodiment, each of the power transmission devices 100 uses, for example, the first to third power transfer approaches described above. Therefore, the power transfer system 1100 can transmit power, even if a plurality of power transmission devices is present, from one power transmission device to one power receiving device without being interfered by other power transmission devices.

The power transmission device 100 and the power receiving device 200 constituting the power transfer system 1100 according to the first embodiment capable of realizing the above power transfer approaches will be described below. Among the power transmission devices 100, the power transmission device 100A will be described below and a description of the power transmission device 100B is omitted because the power transmission device 100B has the same configuration. FIG. 12 is an explanatory view exemplifying the configuration of the power transfer system 1100 according to the first embodiment of the present invention. As shown in FIG. 12, the power transmission device 100A and the power receiving device 200 transmit power in a non-contact manner.

Here, before describing the configuration of each of the power transmission device 100A and the power receiving device 200 constituting the power transfer system 1100, first a transfer means of power according to an embodiment of the present invention will be described. The transfer means of power will be described below by focusing on a power transmission part 104 provided with the power transmission device 100A and a power receiving part 204 provided with the power receiving device 200 shown in FIG. 12.

[Transfer Means of Power According to an Embodiment of the Present Invention]

[A] First Transfer Means: Transfer of Power Using Electromagnetic Induction

Figure 13:
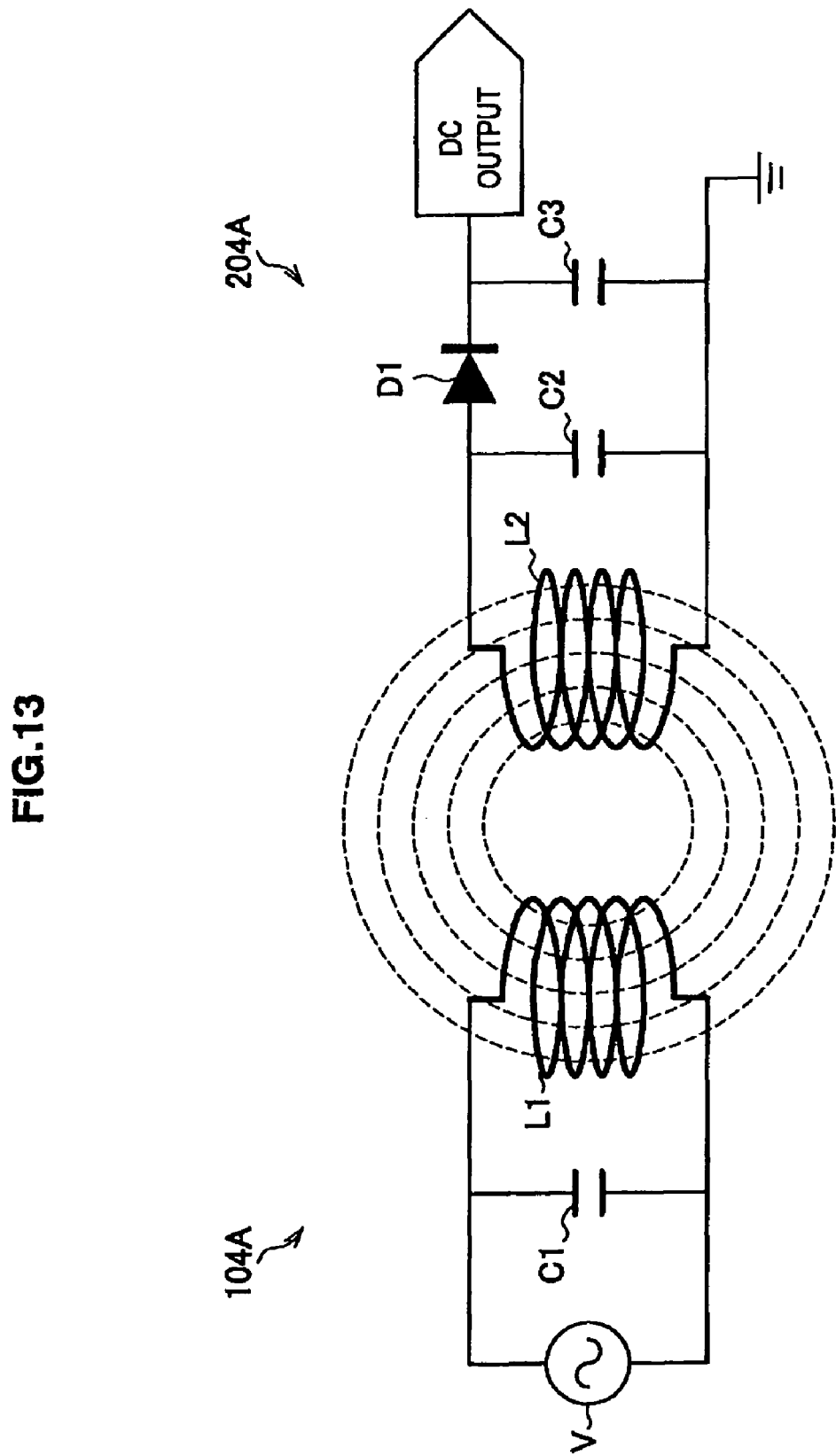
FIG. 13 is an explanatory view illustrating a first transfer means of power according to an embodiment of the present invention.

FIG. 13 is an explanatory view illustrating a first transfer means of power according to an embodiment of the present invention. Here, FIG. 13 shows a configuration example of a power transmission part 104A of the power transmission device 100A that transfers power by using electromagnetic induction and a power receiving part 204A of the power receiving device 200.

Referring to FIG. 13, the power transmission part 104A has an AC power supply V, a capacitor C1, and an inductor L1. The power receiving part 204A has an inductor L2, a capacitor C2, a capacitor C3, and a diode D1. The power transmission part 104A passes an AC current to the inductor L1 by the AC power supply V to generate a magnetic flux around the inductor L1. Then, the power receiving part 204A obtains a DC current by an AC current flowing through the inductor L2 by the magnetic flux being rectified by the diode D1 and the capacitor C3. Therefore, the power receiving device 200 to which the first transfer means is applied can obtain power from the power transmission device 100A.

When the transfer means of power using electromagnetic induction as shown in FIG. 13 is used, transfer efficiency of power can be varied, for example, by changing winding numbers and arrangement positions of the inductor L1 and the inductor L2 to optimize the transfer efficiency.

[B] Second Transfer Means: Transfer of Power Using Radio Waves

Figure 14:
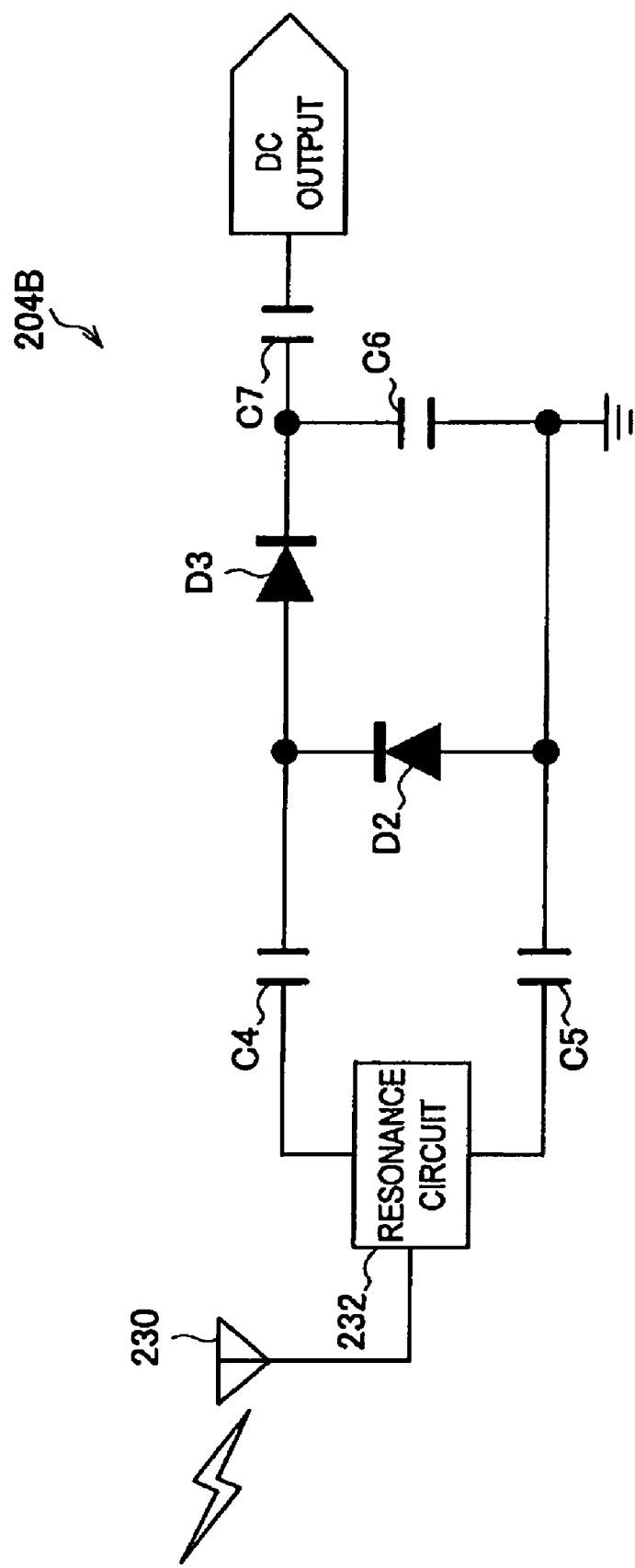
FIG. 14 is an explanatory view illustrating a second transfer means of power according to an embodiment of the present invention.

FIG. 14 is an explanatory view illustrating a second transfer means of power according to an embodiment of the present invention. Here, FIG. 14 shows a configuration example of a power receiving part 204B of the power receiving device 200 that receives power using radio waves.

As shown in FIG. 14, the power receiving part 204B has an antenna 230, a resonance circuit 232, a capacitor C4, a capacitor C5 a diode D2, a diode D3, a capacitor C6, and a capacitor C7. Here, the resonance circuit 232 includes, for example, a capacitor having a predetermined electrostatic capacity and an inductor having a predetermined inductance. In the above configuration, when the antenna 230 receives radio waves transmitted by a power transmission part 104B (not shown) of the power transmission device 100A, an AC current is supplied from the antenna 230 to the resonance circuit 232 and the resonance circuit 232 amplifies the AC current by resonance. Further, the power receiving part 204B obtains a DC current by extracting a direct-current component after the amplified AC current being rectified by a rectifier circuit including the diode D3 and the capacitor C6. Therefore, the power receiving device 200 to which the second transfer means is applied can obtain power from the power transmission device 100A.

[C] Third Transfer Means: Transfer of Power Using Resonance of a Magnetic Field

Figure 15:
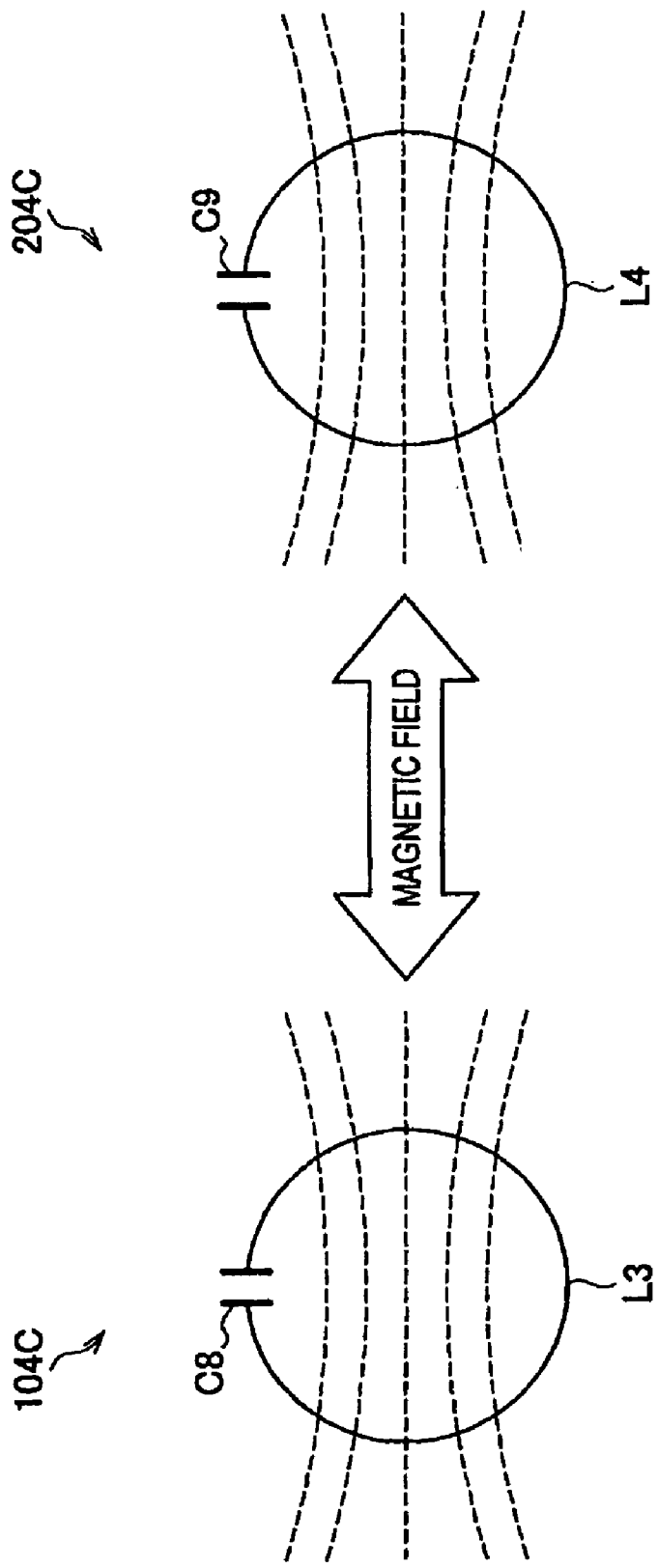
FIG. 15 is an explanatory view illustrating a third transfer means of power according to an embodiment of the present invention.

FIG. 15 is an explanatory view illustrating a third transfer means of power according to an embodiment of the present invention. Here, FIG. 15 shows a configuration example of a power transmission part 104C of the power transmission device 100A and a power receiving part 204C of the power receiving device 200 that receive power using resonance of a magnetic field.

The power transmission part 104C includes, as shown in FIG. 15, a resonance circuit having a capacitor C8 and an inductor L3 and, for example, an AC power supply (not shown) is connected to the resonance circuit. The power receiving part 204C has a capacitor C9 and an inductor L4. Here, the third transfer means is a means using the principle of resonance that when two oscillators having a natural frequency are placed side by side, a vibration applied to one oscillator is transmitted to the other oscillator. Thus, transfer efficiency can be optimized by adjusting the electrostatic capacity and inductance of the power transmission part 104C and the power receiving part 204C so that the resonance frequency by the capacitor C8 and the inductor L3 of the power transmission part 104C and that by the capacitor C9 and the inductor L4 of the power receiving part 204C become more equal. By using the principle of resonance, as described above, the power receiving device 200 to which the third transfer means is applied can obtain power from the power transmission device 100A.

Here, power transfer using the principle of resonance (third transfer means) described above achieves higher transfer efficiency of power than that using electromagnetic induction (first transfer means) or that using radio waves (second transfer means). For example, the power receiving device 200 to which the third transfer means is applied can receive power of about several kW when the distance to the power transmission device 100A is several meters.

Figure 16:
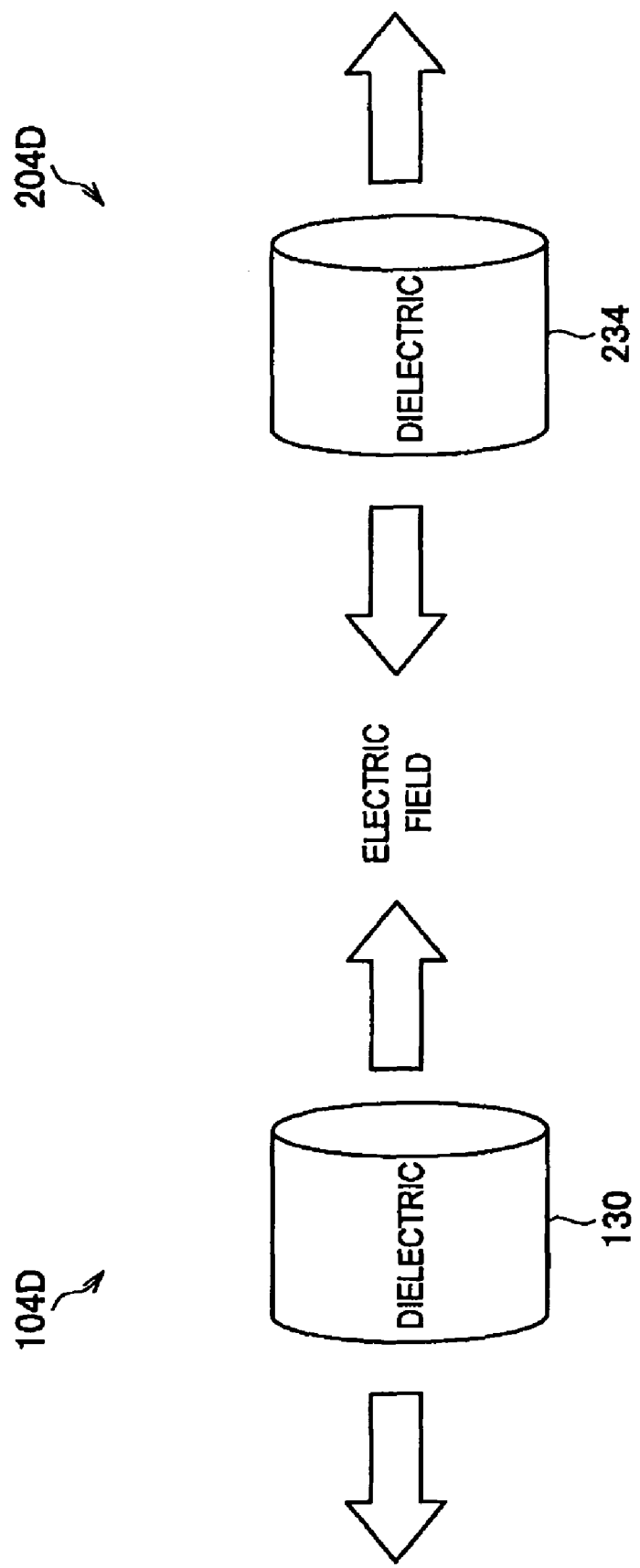
FIG. 16 is an explanatory view illustrating a fourth transfer means of power according to an embodiment of the present invention.

[D] Fourth Transfer Means: Transfer of Power Using Resonance of an Electric Field FIG. 16 is an explanatory view illustrating a fourth transfer means of power according to an embodiment of the present invention. Here, FIG. 16 shows a configuration example of a power transmission part 104D of the power transmission device 100A and a power receiving part 204D of the power receiving device 200 that receive power using resonance of an electric field.

Like the third transfer means described above, the fourth transfer means is a transfer means using the principle of resonance that when two oscillators (In FIG. 16, a dielectric 130 and a dielectric 234) having a natural frequency are placed side by side, a vibration applied to one oscillator is transmitted to the other oscillator. Thus, transfer efficiency can be optimized by selecting each dielectric so that the resonance frequency of the dielectric 130 in the power transmission part 104D and that of the dielectric 234 in the power receiving part 204D become more equal. Like the power receiving device 200 to which the third transfer means is applied, the power receiving device 200 to which the fourth transfer means is applied can obtain power from the power transmission device 100A.

In the power transfer system 1100 according to the first embodiment of the present invention, power can be transferred from the power transmission device 100A to the power receiving device 200 by using, for example, the first to fourth transfer means in [A] to [D] described above. It is needless to say that transfer unit of power in the power transfer system 1100 according to the first embodiment are not limited to the above first to fourth transfer means.

The configuration of each of the power transmission device 100A and the power receiving device 200 constituting the power transfer system 1100 will be described with reference to FIG. 12 again.

[The Power Transmission Device 100A]

First, the power transmission device 100A will be described. The power transmission device 100A includes a communication part 102, the power transmission part 104, a control part 106, an operation part 108, and a display part 110.

The power transmission device 100A may include, for example, a ROM (Read Only Memory; not shown) in which programs and control data such as arithmetic parameters used by the control part 106 are recorded, a RAM (Random Access Memory; not shown) in which programs and the like executed by the control part 106 are temporarily stored, and a storage part (not shown) in which applications and the like can be stored. The power transmission device 100A connects each of the above components by a bus as a transmission path of data.

Here, for example, a magnetic recording medium such as a hard disk and a nonvolatile memory such as a EEPROM (Electrically Erasable and Programmable Read Only Memory), flash memory, MRAM (Magnetoresistive Random Access Memory), FeRAM (Ferroelectric Random Access Memory), and PRAM (Phase change Random Access Memory) can be cited as the storage part (not shown), but the storage part is not limited to the above examples.

[Hardware Configuration Example of the Power Transmission Device 100]

Figure 17:
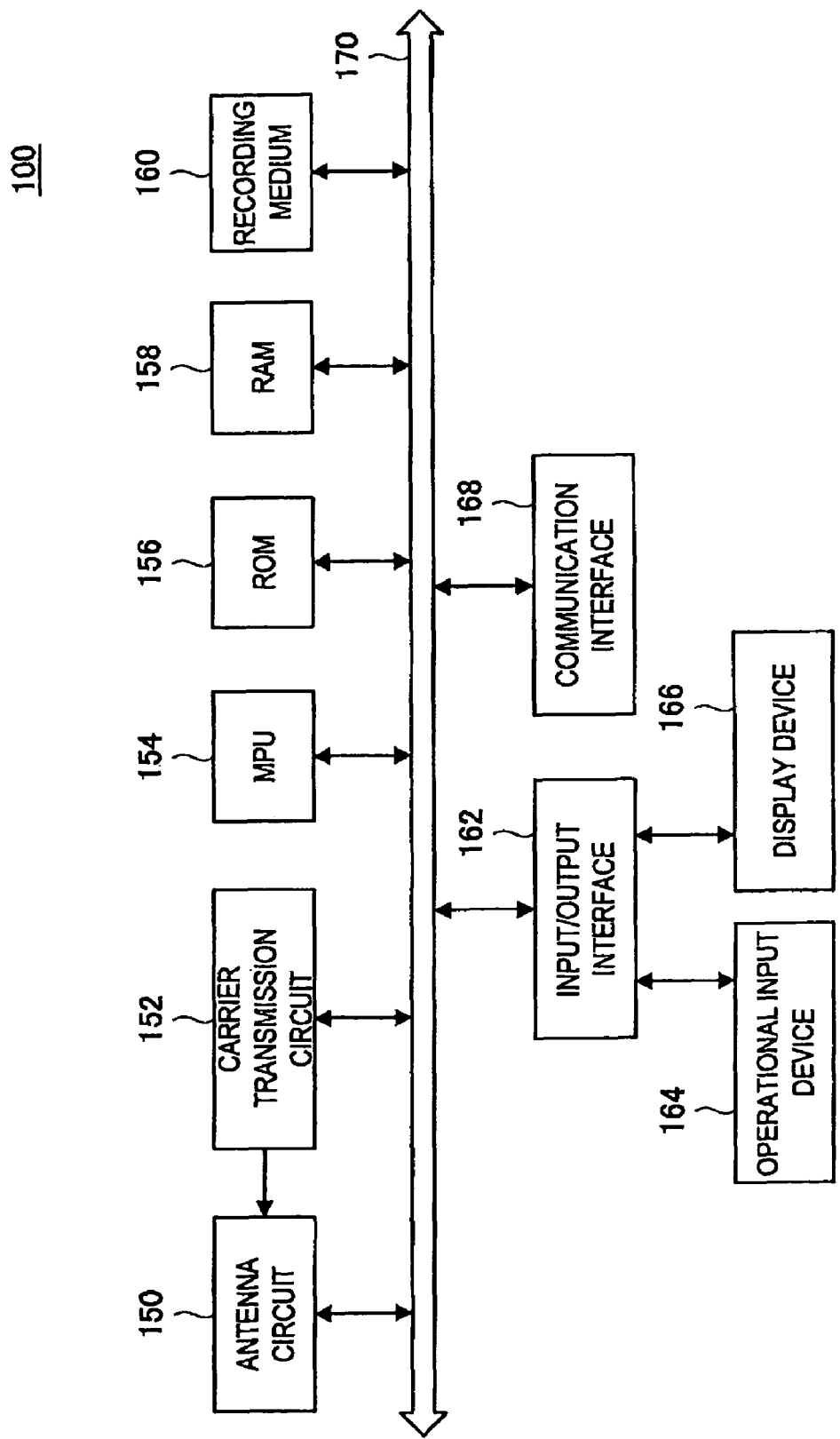
FIG. 17 is an explanatory view exemplifying the hardware configuration of the power transmission device according to an embodiment of the present invention.

FIG. 17 is an explanatory view exemplifying the hardware configuration of the power transmission device 100A according to an embodiment of the present invention. Referring to FIG. 17, the power transmission device 100A includes, for example, an antenna circuit 150, a carrier transmission circuit 152, an MPU 154, a ROM 156, a RAM 158, a recording medium 160, an input/output interface 162, an operational input device 164, a display device 166, and a communication interface 168. The power transmission device 100A connects each of the above components, for example, by a bus 170 as a transmission path of data.

The antenna circuit 150 and the carrier transmission circuit 152 function as the power transmission part 104 in the power transmission device 100A. Thus, the antenna circuit 150 and the carrier transmission circuit 152 can adopt, for example, the configurations corresponding to FIG. 13 to FIG. 16 to realize the first to fourth transfer means of power described above. The antenna circuit 150 includes, for example, a resonance circuit having a coil with a predetermined inductance and a capacitor with a predetermined electrostatic capacity as a transceiver antenna, but is not limited to the above example. The carrier transmission circuit 152 includes, for example, an AC power supply and an amplifier circuit to amplify output of the AC power supply.

The MPU 154 functions as the control part 106 to control the whole power transmission device 100A. The MPU 154 can also play the role of a determination part 120, a power transmission information transmission control part 122, and a power transmission control part 124 described later in the power transmission device 100A.

The ROM 156 stores programs and control data such as arithmetic parameters used by the MPU 154 and the RAM 158 temporarily stores programs and the like executed by the MPU 154.

The recording medium 160 is a storage means provided with the power transmission device 100A. For example, applications and the like are stored therein as recording medium 160. Here, for example, a magnetic recording medium such as a hard disk and a nonvolatile memory such as a flash memory can be cited as the recording medium 160, but the recording medium 160 is not limited to the above examples.

The input/output interface 162 connects, for example, the operational input device 164 and the display device 166. The operational input device 164 functions as the operation part 108 and the display device 166 functions as the display part 110. Here, the input/output interface 162 includes, for example, a USB (Universal Serial Bus) terminal, a DVI (Digital Visual Interface) terminal, and an HDMI (High-Definition Multimedia Interface) terminal, but is not limited to the above examples. The operational input device 164 includes, for example, a button, a directional key, a rotational selector such as a jog dial and a combination thereof and is provided on the power transmission device 100 and connected to the input/output interface 162 inside the power transmission device 100. The display device 166 includes, for example, an LCD (Liquid Crystal Display) and an organic EL display (organic ElectroLuminescence display, also called an OLED display (Organic Light Emitting Diode display)) and is provided on the power transmission device 100A and connected to the input/output interface 162 inside the power transmission device 100A. It is needless to say that the input/output interface 162 can be connected to an operational input device (for example, a keyboard and a mouse) as an external device of the power transmission device 100A and a display device (for example, an external display).

The communication interface 168 is a communication means provided with the power transmission device 100A and functions as the communication part 102 to perform communication with the power transmission device 100B, the power receiving device 200 and the like by radio/via wire communication. Here, the communication interface 168 includes, for example, a communication antenna and RF circuit (radio communication), an IEEE802.15.1 port and transceiver circuit (radio communication), an IEEE802.11b port and transceiver circuit (radio communication), a LAN terminal and transceiver circuit (wire communication) and the like, but is not limited to the above examples.

With the hardware configuration as shown in FIG. 17, the power transmission device 100A constitutes the power transfer system 1100 capable of realizing the first to third power transfer approaches according to the first embodiment of the present invention described above.

Referring to FIG. 12 again, the configuration of the power transmission device 100A will be described. The communication part 102 is a communication means provided with the power transmission device 100A and plays the role of performing communication with the power transmission device 100B, the power receiving device 200 and the like by radio/wire communication. Here, the communication part 102 can perform radio communication with an external device such as the power transmission device 100B using light, radio waves, sound waves and the like, but the unit used is not limited to the above examples. Communication of the communication part 102 is controlled, for example, by the communication part 106.

The power transmission part 104 is a power transfer means provided with the power transmission device 100A and plays the role of transmitting power (by radio) to the power receiving device 200 in a non-contact manner. Here, the power transmission part 104 can transmit power to the power receiving device 200 using, for example, electromagnetic induction (first transfer means), radio waves (second transfer means), or resonance of a magnetic field or an electric field (third transfer means, fourth transfer means), but the unit used is not limited to the above examples. Transmission power from the power transmission part 104 is controlled, for example, by the power transmission control part 124 provided with the control part 106.

The control part 106 includes, for example, an MPU and plays the role of controlling the whole power transmission device 100A. The control part 106 is provided with the determination part 120, the power transmission information transmission control part 122, and the power transmission control part 124.

The determination part 120 determines whether power can be transmitted based on external power transmission information received by the communication part 102. Here, the determination part 120 plays the role of performing the processing (reception determination processing) in [1-1], the processing (assignment processing) in [2-2], or the processing (assignment processing) [3-2] in accordance with the power transfer approach used by the power transmission device 100.

The power transmission information transmission control part 122 generates power transmission information and controls the communication part 102 to transmit the generated power transmission information. Here, the power transmission information transmission control part 122 plays the role of performing the processing (power transmission information transmission processing) in [1-2], the processing (communication processing) in [2-1], or the processing (communication processing) [3-1] in accordance with the power transfer approach used by the power transmission device 100A. It is needless to say that generation of power transmission information is not limited to be performed by the power transmission information transmission control part 122.

The power transmission control part 124 controls the power transmission part 104 to selectively transmit power based on a determination result from the determination part 120. Here, the power transmission control part 124 plays the role of performing the processing (power transfer processing) in [1-3], the processing (power transfer processing) in [2-3], or the processing (power transfer processing) in [3-3] in accordance with the power transfer approach used by the power transmission device 100.

The operation part 108 is an operation means of the power transmission device 100A enabling a user to perform predetermined operations. With the operation part 108 being provided with the power transmission device 100A, for example, the power transmission device 100A can be caused to perform an operation desired by a user. Here, for example, an operational input device such as a keyboard and a mouse, a button, a directional key, a rotational selector such as a jog dial, and a combination thereof can be cited as the operation part 108, but the operation part 108 is not limited to the above examples.

The display part 110 is a display means provided with the power transmission device 100A and displays various kinds of information on a display screen. For example, an operation screen to cause the power transmission device 100A to perform a desired operation and a screen to display a communication state with the other power transmission device 100 (external power transmission device) such as the power transmission device 100B can be cited as a screen displayed in a display screen of the display part 110, but the screen is not limited to the above examples. Here, for example, an LCD and an organic EL display can be cited as the display part 110, but the display part 110 is not limited to the above examples.

With the above configuration, the power transmission device 100A can transmit power, even if a plurality of power transmission devices 100 is present, to one power receiving device 200 without being interfered by the other power transmission devices 100.

[The Power Receiving Device 200]

Next, the power receiving device 200 will be described. The power receiving device 200 is provided with a communication part 202, the power receiving part 204, and a control part 206.

The power receiving device 200 may be provided with a ROM (not shown) in which programs and control data such as arithmetic parameters used by the control part 206 are recorded, a RAM (not shown) in which programs and the like executed by the control part 206 are temporarily stored, an operation part (not shown) operable by a user of the power receiving device 200, a display part (not shown), or a storage part (not shown) in which applications and the like can be stored. The power receiving device 200 connects each of the above components, for example, by a bus as a transmission path of data.

Here, for example, an operational input device such as a keyboard and a mouse, a button, a directional key, and a combination thereof can be cited as the operation part (not shown), but the operation part is not limited to the above examples. For example, an LCD and an organic EL display can be cited as the display part (not shown), but the display part is not limited to the above examples.

For example, a magnetic recording medium such as a hard disk and a nonvolatile memory such as a flash memory can be cited as the storage part, but the storage part is not limited to the above examples.

[Hardware Configuration Example of the Power Receiving Device 200]

Figure 18:
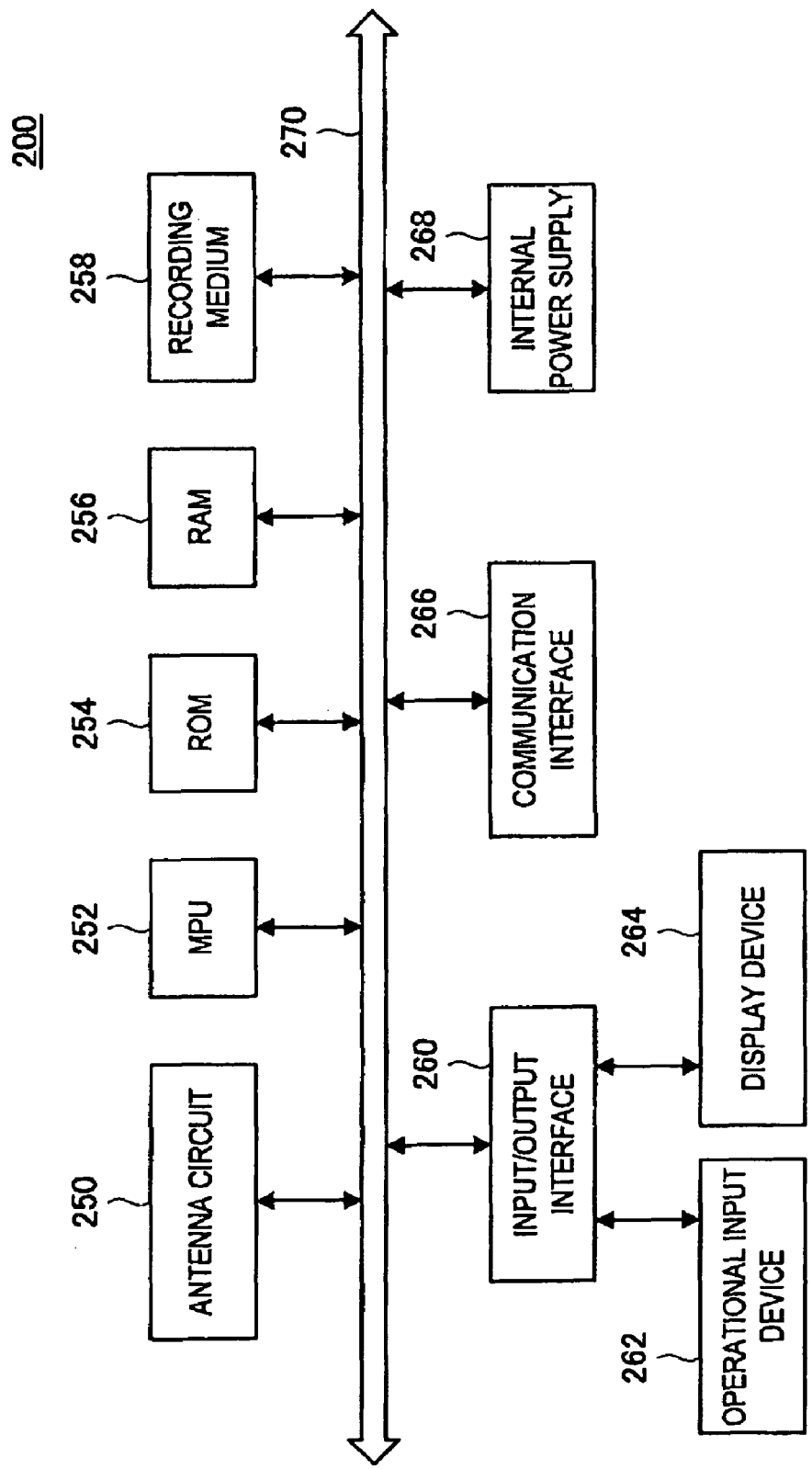
FIG. 18 is an explanatory view exemplifying the hardware configuration of a power receiving device according to an embodiment of the present invention.

FIG. 18 is an explanatory view exemplifying the hardware configuration of the power receiving device 200 according to an embodiment of the present invention. Referring to FIG. 18, the power receiving device 200 includes, for example, an antenna circuit 250, an MPU 252, a ROM 254, a RAM 256, a recording medium 258, an input/output interface 260, an operational input device 262, a display device 264, a communication interface 266, and an internal power supply 268. The power receiving device 200 connects each of the above components, for example, by a bus 270 as a transmission path of data.

The antenna circuit 250 functions as the power receiving part 204 of the power receiving device 200. The antenna circuit 250 can adopt, for example, the configurations shown in FIG. 13 to FIG. 16 corresponding to the transfer means of power in the power transmission part 104 provided with the power transmission device 100A.

The MPU 252 functions as the control part 206 to control the whole power receiving device 200. The ROM 254 stores programs and control data such as arithmetic parameters used by the MPU 252 and the RAM 256 temporarily stores programs and the like executed by the MPU 252.

The recording medium 258 is a storage means provided with the power receiving device 200 and stores, for example, applications. Here, for example, a magnetic recording medium such as a hard disk and a nonvolatile memory such as a EEPROM, flash memory, MRAM, FeRAM, and PRAM can be cited as the recording medium 258, but the recording medium 258 is not limited to the above examples.

The input/output interface 260 connects, for example, the operational input device 262 and the display device 264. Here, the input/output interface 260 includes, for example, a USB terminal, a DVI terminal, and an HDMI terminal, but is not limited to the above examples. The operational input device 262 includes, for example, a button, a directional key, a rotational selector such as a jog dial and a combination thereof and is provided on the power receiving device 200 and connected to the input/output interface 260 inside the power receiving device 200. The display device 264 includes, for example, an LCD and an organic EL display and is provided on the power receiving device 200 and connected to the input/output interface 260 inside the power receiving device 200. It is needless to say that the input/output interface 260 can be connected to an operational input device (for example, a keyboard and a mouse) as an external device of the power receiving device 200 and a display device (for example, an external display).

The communication interface 266 is a communication means provided with the power receiving device 200 and functions as the communication part 202 to perform communication with an external device such as the power transmission device 100A by radio/wire communication. Here, the communication interface 266 includes, for example, a communication antenna and RF circuit (radio communication), an IEEE802.15.1 port and transceiver circuit (radio communication), an IEEE802.11b port and transceiver circuit (radio communication), a LAN terminal and transceiver circuit (wire communication) and the like, but is not limited to the above examples.

The internal power supply 268 is a power supply provided with the power receiving device 200 and capable of accumulating received power and supplying a drive voltage to drive each component of the power receiving device 200. Here, the internal power supply 268 includes, for example, a secondary battery such as a lithium-ion rechargeable battery, but is not limited to the above example.

With the hardware configuration as shown in FIG. 18, the power receiving device 200 can receive power transmitted by each of the power transmission devices 100. Therefore, the power receiving device 200 can constitute the power transfer system 1100 with the hardware configuration as shown in FIG. 18.

Referring to FIG. 12, the configuration of the power receiving device 200 will be described. The communication part 202 is a communication means provided with the power receiving device 200 and plays the role of performing communication with an external device such as the power transmission device 100A by radio/wire communication. Here, the communication part 202 can adopt, for example, a configuration corresponding to that of the communication part 102 of the power transmission devices 100A.

The power receiving part 204 is a power receiving means provided with the power receiving device 200 and plays the role of receiving power transmitted from each of the power transmission devices 100 in a non-contact manner (by radio). Here, the power receiving part 204 can adopt, for example, a configuration corresponding to that of the power transmission part 104 of the power transmission device 100A and receives power by using, for example, electromagnetic induction (first transfer means), radio waves (second transfer means), or resonance of a magnetic field or an electric field (third transfer means, fourth transfer means).

The control part 206 includes, for example, an MPU and plays the role of controlling the whole power receiving device 200 and performing various kinds of processing.

With the above configuration, the power receiving device 200 can receive power transmitted from each of the power transmission devices 100 and perform various kinds of processing using the received power.

The power transfer system 1100 according to the first embodiment of the present invention has, as described above, one or more the power transmission devices 100 and one or more the power receiving devices 200. Each of the power transmission devices 100 transmits power to one or the plurality of the power receiving devices 200 and the power receiving device 200 receives power transmitted from the power transmission device 100.

Here, each of the power transmission devices 100 selectively transmits power when it is determined that the other power transmission device 100 (external power transmission device) will not transmit power by using the first to third power transfer approaches described above. Therefore, the power transfer system 1100 can transmit power, even if a plurality of power transmission devices is present, from one power transmission device to one power receiving device without being interfered by other power transmission devices.

[Program Related to the Power Transfer System 1100]

Power can be transmitted using the first to third power transfer approaches described above by a program to cause a computer to function as the power transmission device 100 according to the first embodiment of the present invention. The power transfer system 1100 capable of transmitting power from one power transmission device to one power receiving device without being interfered by other power transmission devices is realized, even if a plurality of power transmission devices is present, by a program to cause a computer to function as the power transmission device 100 according to the first embodiment of the present invention.

(The Power Transfer System 1200 According to the Second Embodiment)

Next, the power transfer system 1200 according to the second embodiment of the present invention will be described. In the first power transfer system 1100 according to the first embodiment described above, the configuration in which the power transmission device 100 selectively transmits power when the external power transmission device determines not to transmit power is described. In contrast, in the power transfer system 1200 according to the second embodiment, a power receiving device 300 (The power receiving device constituting the power transfer system 1200 will generically be called a "power receiving device 300") selects the power transmission device 100 to transmit power to be received. That is, the power transmission device 100 in the second embodiment transmits power when selected by the power receiving device 300. Therefore, in the power transfer system 1200, transmission power from one power transmission device to one power receiving device is realized, even if a plurality of power transmission devices is present, without being interfered by other power transmission devices.

Before the configuration of the power transfer system 1200 is described, power transfer approaches in the power transfer system 1200 will first be described.

[Power Transfer Approach in the Second Embodiment]
[Overview of Processing in the Power Receiving Device 300]
(2-1) Derivation of Information of Power Reception The power receiving device 300 derives information of power reception for each of the power transmission devices 100. The information of power reception is information providing the status relating to transmission power between the power transmission devices 100 and the power receiving device 300 and is used for selection of the power transmission devices 100.

Here, if power is transferred in a non-contact manner, the status relating to transmission power between the power transmission devices 100 and the power receiving device 300 may not be constant. The status relating to transmission power may change, for example, by a relationship between the orientation of a power transmission antenna of the power transmission device 100 and that of a power receiving antenna of the power receiving device 300 or the presence of an obstacle between the power transmission device 100 and the power receiving device 300. If the status relating to transmission power is not constant, as described above, various kinds of faults may occur in the power receiving device 300 even if the power transmission device 100 transmits power corresponding to a requested power transmission amount requested by the power receiving device 300. The above faults that may occur includes, for example, that the power receiving device 300 may not obtain power necessary for operation from the power transmission device 100. Thus, the power receiving device 300 derives information of power reception to select the power transmission device 100 from which power can be received more efficiently.

The information of power reception includes, for example, a coupling coefficient κ between the power transmission device 100 and the power receiving device 300, but is not limited to the above example. An example in which the power receiving device 300 derives the coupling coefficient κ as information of power reception will be described below. A derivation method of information of power reception will be described later.

(2-2) Selection of the Power Transmission Device 100

After the coupling coefficient κ for each of the power transmission devices 100 being derived in (2-1) described above, the power receiving device 300 selects the power transmission device 100 to transmit power based on the derived coupling coefficient κ. Here, the power receiving device 300 may select the power transmission device 100 having the largest coupling coefficient κ, but the selection is not limited to the above example. For example, the power receiving device 300 can select the power transmission device 100 further based on various conditions such as "whether the power transmission device 100 can transmit power requested by the power receiving device 300".

(2-3) Transmission of a Power Transmission Request and Reception of Power

The power receiving device 300 transmits a power transmission request to request transmission power to the power transmission device 100 selected in the processing in (2-2) described above. Here, the power transmission request may contain, for example, information relating to power reception (for example, the coupling coefficient κ) and information of received power desired by the power receiving device 300, but the contained information is not limited to the above examples.

Here, after receiving the power transmission request, the power transmission device 100 decides transmission power Ps to be transmitted based on information contained in the power transmission request and transits the decided transmission power Ps to the power receiving device 300. The power transmission device 100 can decide the transmission power Ps, for example, according to a Formula 1 below. Here, Pr in the Formula 1 shows received power desired by the power receiving device 300 and κ shows the coupling coefficient between the power transmission device 100 and the power receiving device 300.

$$Ps=Pr/\kappa \quad \text{(Formula 1)}$$

Then, the power receiving device 300 receives power transmitted from the power transmission device 100 in response to the power transmission request.

In the power transfer system 1200 according to the second embodiment, each of the power receiving devices 300 constituting the power transfer system 1200 performs, for example, the processing (derivation of information of power reception) in (2-1), the processing (selection of the power transmission device 100) in (2-2), and the processing (transmission of a power transmission request and reception of power) in (2-3). Therefore, the power transfer system 1200 can transmit power, even if a plurality of power transmission devices is present, from one power transmission device to one power receiving device without being interfered by other power transmission devices.

[Power Receiving Method in the Power Receiving Devices 300]

Figure 19:
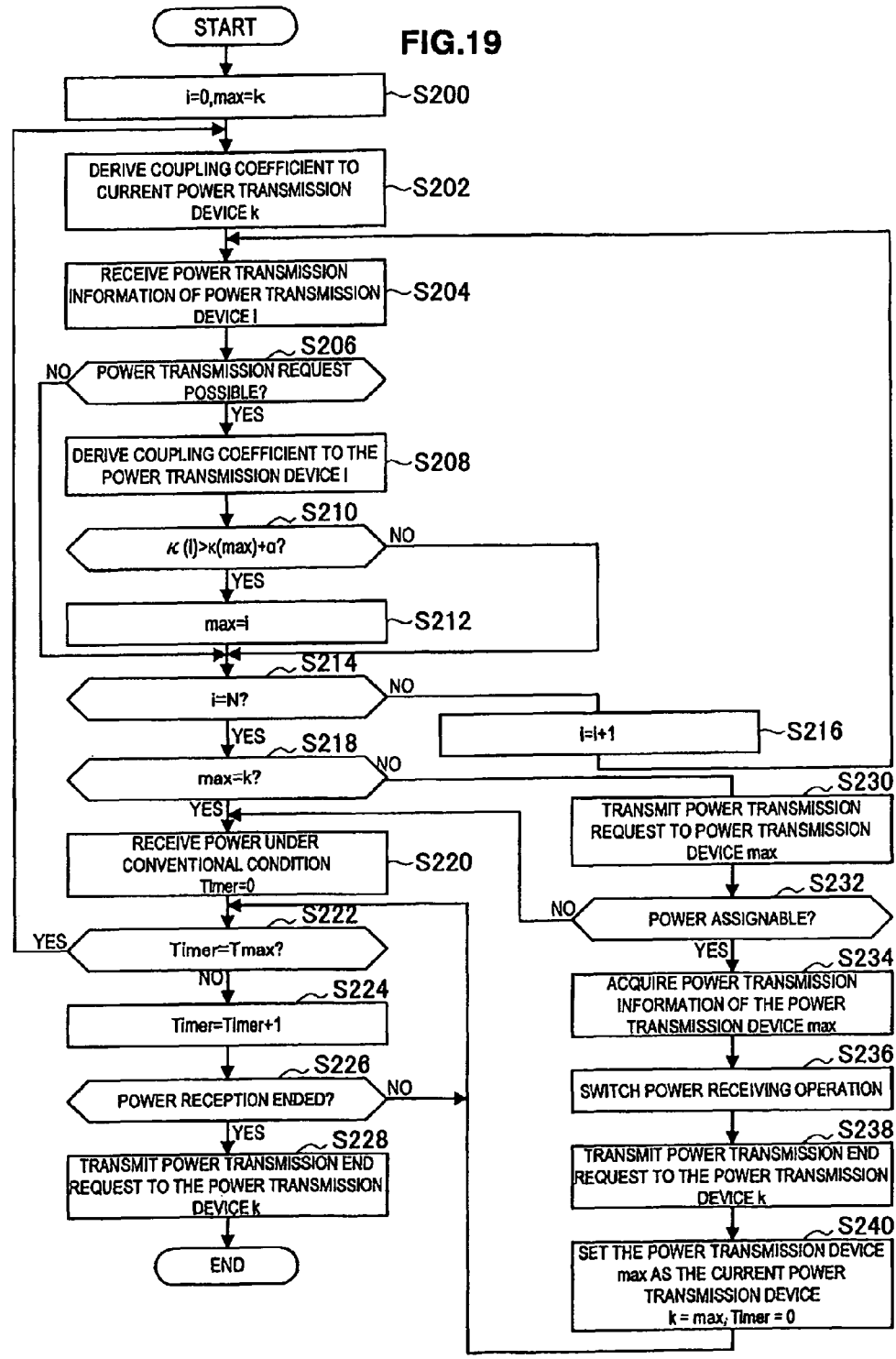
FIG. 19 is a flow chart exemplifying a power receiving method in a power receiving device using a power transfer approach in a power transfer system according to the second embodiment of the present invention.

Next, a power receiving method in the power receiving device 300 using a second power transfer approach will be described. FIG. 19 is a flow chart exemplifying a power receiving method in the power receiving device 300 using a power transfer approach in the power transfer system 1200 according to the second embodiment of the present invention. Here, FIG. 19 shows an example in which the power receiving device 300 derives the coupling coefficient κ as information of power reception.

The power receiving devices 300 sets initial values (S200). Here, FIG. 19 shows an example in which the power receiving device 300 sets i=0 and max=k as initial values. Here, i indicates a device number of the power transmission device 100 and k indicates the device number corresponding to a current power transmission device k. The current power transmission device indicates a power transmission device from which the power receiving device 300 is receiving power or the latest power transmission device from which power has been received.

The power receiving device 300 measures the coupling coefficient κ(k) to the current power transmission device k (S202).

<Derivation Method of the Coupling Coefficient κ>

Figure 20:
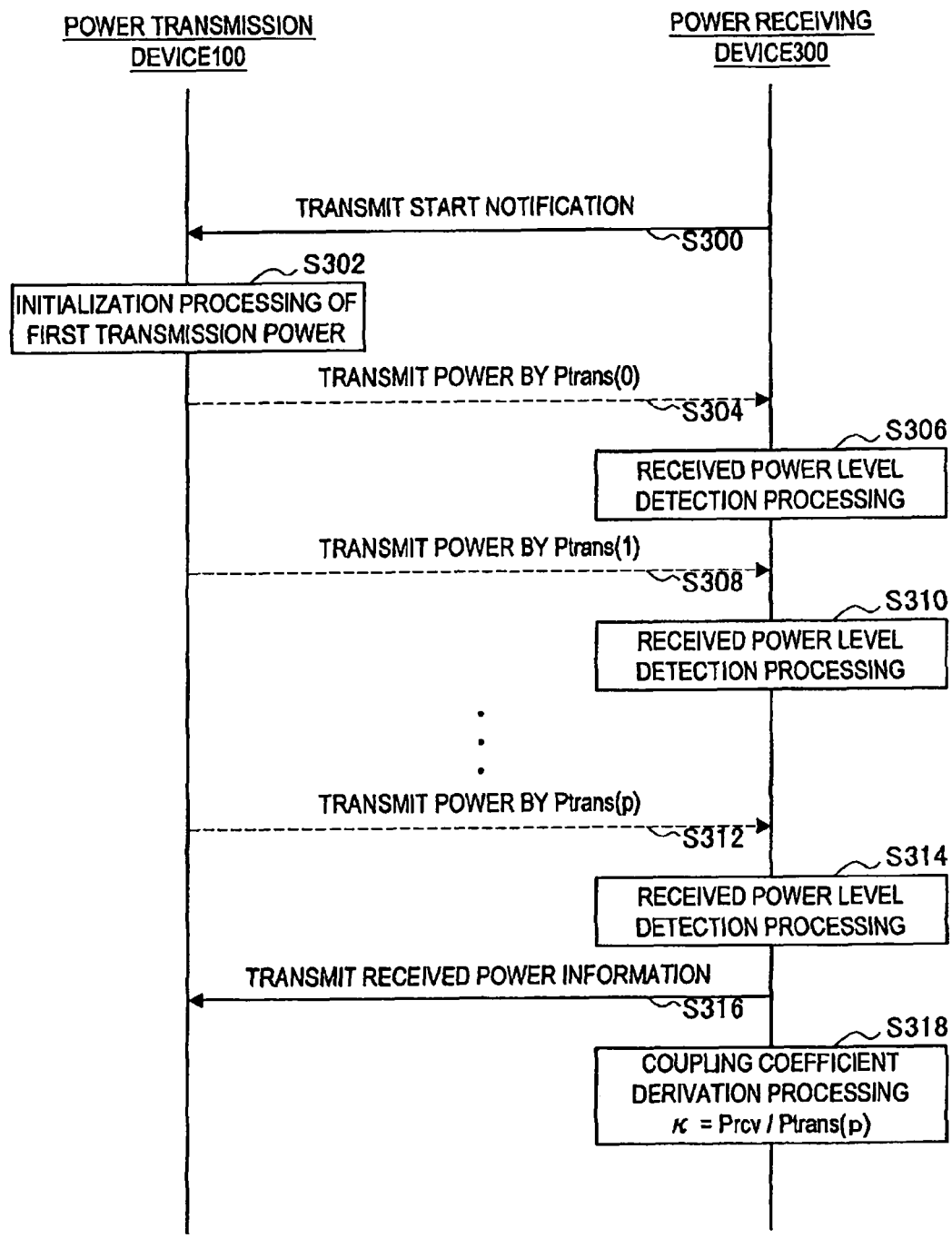
FIG. 20 is an explanatory view exemplifying a derivation method of a coupling coefficient k in the power transfer system according to the second embodiment of the present invention.

Here, the derivation method of the coupling coefficient κ according to an embodiment of the present invention will be described. FIG. 20 is an explanatory view exemplifying the derivation method of the coupling coefficient κ in the power transfer system 1200 according to the second embodiment of the present invention.

The power receiving device 300 transmits a start notification of starting a derivation of the coupling coefficient κ to the power transmission device 100(S300).

The power transmission device 100 that receives the start notification transmitted at step S300 makes initial settings of first transmission power (S302). Here, the first transmission power is transmission power to cause the power receiving device 300 to derive information of power reception. The power transmission device 100 incrementally increases the first transmission power transmitted to the power receiving device 300 until received power information transmitted from the power receiving device 300 indicating that the received power level has satisfied a predetermined level is received. By increasing the first transmission power incrementally, as described above, the power transmission device 100 can cause the power receiving device 300 to derive the coupling coefficient κ corresponding to the status relating to transmission power. Therefore, the power transmission device 100 makes initial settings of the first transmission power at step S302 to cause the power receiving device 300 to derive the coupling coefficient κ corresponding to the status relating to transmission power.

After initial settings of the first transmission power being made at step S302, the power transmission device 100 transmits first transmission power Ptrans(0) corresponding to the initial values to the power receiving device 300 (S304). At this point, the power transmission device 100 notifies the power receiving device 300 of the value of the first transmission power Ptrans(0).

The power receiving device 300 that receives the first transmission power Ptrans(0) transmitted at step S304 performs received power level detection processing to detect whether the received power level satisfies the predetermined level based on the first transmission power Ptrans(0) (S306).

Here, if the received power level detection processing detects that the received power level satisfies the predetermined level, the power receiving device 300 transmits received power information indicating that the received power level has satisfied the predetermined level to the power transmission device 100. If the received power level detection processing does not detect that the received power level satisfies the predetermined level, the power receiving device 300 performs no specific communication with the power transmission device 100. FIG. 20 shows a case in which the power receiving device 300 does not detect at step S306 that the received power level satisfies the predetermined level. When the received power level detection processing does not detect that the received power level satisfies the predetermined level, it is needless to say that the power receiving device 300 according to an embodiment of the present invention can notify the power transmission device 100 that the predetermined level being satisfied by the received power level is not detected.

If the received power information to the first transmission power Ptrans(0) transmitted at step S304 is not received, the power transmission device 100 transmits first transmission power Ptrans(1) obtained by the first transmission power Ptrans(0) being increased by one level to the power receiving device 300 (S308). Then, the power receiving device 300 that receives the first transmission power Ptrans(1) transmitted at step S308 performs, like at step S306, received power level detection processing to detect whether the received power level satisfies the predetermined level based on the first transmission power Ptrans(1) (S310). Here, FIG. 20 shows a case in which the power receiving device 300 does not detect at step S310 that the received power level satisfies the predetermined level. If the power receiving device 300 does not detect that the received power level satisfies the predetermined level, the power transmission device 100 repeats the same step at step S308, for example, until the first transmission power reaches a value corresponding to the maximum value.

If, like at step S308, the received power information is not received, the power transmission device 100 transmits first transmission power Ptrans(p) (p is a positive integer) obtained by an increase in first transmission power by one level to the power receiving device 300 (S312). Then, the power receiving device 300 that receives the first transmission power Ptrans(p) transmitted at step S312 performs, like at step S306, received power level detection processing to detect whether the received power level satisfies the predetermined level based on the first transmission power Ptrans(p) (S314).

If the predetermined level being satisfied by the received power level is detected at step S314, the power receiving device 300 transmits the received power information to the power transmission device 100 (S316). The power transmission device 100 that receives the received power information transmitted at step S316 stops transmission of the first transmission power in response to reception of the received power information.

After the received power information being transmitted at step S316, the power receiving device 300 derives the coupling coefficient κ based on the value of the first transmission power Ptrans(p) (S318). More specifically, the power receiving device 300 derives the coupling coefficient κ, for example, according to a Formula 2 below. Here, Prcv shown in the Formula 2 is a value showing power consumption necessary for detecting that the predetermined level being satisfied by the received power level by the power receiving device 300.

$$\kappa = Prcv/Ptrans(p) \tag{Formula 2}$$

In the power transfer system 1200, the power receiving device 300 can derive the coupling coefficient κ (an example of information of power reception) corresponding to the status relating to transfer of power, for example, by the method shown in FIG. 20 being used.

Referring to FIG. 19 again, an example of processing by the power receiving device 300 will be described. The power receiving device 300 receives power transmission information of the power transmission device i (S204). Then, the power receiving device 300 determines whether or not power transmission can be requested to the power transmission device i based on the received power transmission information (S206).

If it is determined at step S206 that power transmission can be requested to the power transmission device i, the power receiving device 300 derives the coupling coefficient κ (i) to the power transmission device i (S208).

After the coupling coefficient κ (i) to the power transmission device i being derived at step S208, the power receiving device 300 determines whether or not κ (i)>κ (max)+α is satisfied (S210). Here, α shown above is a threshold value used by the power receiving device 300 to switch the power transmission device 100 and can be set freely, for example, in accordance with the configuration of the power transfer system 1200.

If it is determined at step S210 that κ (i)>κ (max)+α is satisfied, the power receiving device 300 sets max=i (S212). If it is not determined at step S210 that κ (i)>κ (max)+α is satisfied, the power receiving device 300 does not perform processing at step S210.

If it is not determined at step S206 that power transmission can be requested to the power transmission device i, the power receiving device 300 does not perform processing at steps S208 to S212.

The power receiving device 300 determines whether or not i=N (S214). N indicates the number of the power transmission devices 100 from which the power receiving device 300 can be receive power. The power receiving device 300 can set N, for example, as the number of the power transmission devices 100 with which communication is established, but N is not limited to the above example.

If it is not determined at step S214 that i=N, the power receiving device 300 sets i=i+1 (S216) and repeats processing at step S204 and thereafter.

Also, if it is not determined at step S214 that i=N, the power receiving device 300 determines whether or not max=k (S218). Here, the determination at step S218 corresponds to a determination whether or not the power receiving device 300 switches the power transmission devices 100 from which power is received from the current power transmission device.

<If the Current Power Transmission Device k is not Switched>

If it is determined at step S218 that max=k, that is, the current power transmission device k is not switched, the power receiving device 300 sets Timer=0 (S220). Processing at step S220 corresponds that the power receiving device 300 receives power under conditions in related art. Here, Timer is a value (a so-called timer) to measure the cycle (Tmax) to update the coupling coefficient κ. The value of Tmax can be set freely in accordance with the configuration of the power transfer system 1200.

<If the Current Power Transmission Device k is Switched>

If it is not determined at step S218 that max=k, that is, the current power transmission device k is switched, the power receiving device 300 transmits a power transmission request to the power transmission device max (S230). Then, the power receiving device 300 determines whether or not power can be assigned based on a response transmitted from the power transmission device max in response to the power transmission request transmitted at step S230 (S232).

With the determination being made by the power receiving device 300 at step S232, for example, a selection of the power transmission devices 100 incapable of transmitting power requested (desired) by the power receiving device 300 can be prevented. Thus, for example, an occurrence of faults such as being unable to drive by power received by the power receiving device 300 is prevented in the power transfer system 1200 and therefore, a more stable power transfer system is realized.

Also, with the determination being made by the power receiving device 300 at step S232, for example, if some power transmission device 100 constituting the power transfer system 1200 is set to transmit power to the specific power receiving device 300, the power transmission device 100 can be excluded from being selected. Therefore, with the determination being made by the power receiving device 300 at step S232, a more flexible power transfer system is realized.

Here, the response transmitted from the power transmission device max in response to a power transmission request includes, for example, information of the degree of room for transmission power, flag whether or not a power transmission target is specified, and information indicating the power transmission target (for example, a MAC address and the like), but is not limited to the above examples.

If it is not determined at step S232 that power can be assigned, the power receiving device 300 determines that the current power transmission device k may not be switched and performs processing at step S220.

If it is determined at step S232 that power can be assigned, the power receiving device 300 acquires power transmission information from the power transmission device max (S234) and switches a power receiving operation (S236). Here, the power receiving device 300 can perform processing at step S236, for example, by switching the resonance frequency to receive power based on power transmission channel information (for example, a channel for use 78 shown in FIG. 3) contained in the acquired power transmission information, but the method is not limited to the above example.

After the power receiving operation being switched at step S236, the power receiving device 300 transmits a power transmission end request to the current power transmission device k (S238). Here, the power transmission end request is information to notify the current power transmission device 100 that the power receiving device 300 has selected the other power transmission device 100.

After the power transmission end request being transmitted at step S238, the power receiving device 300 sets k=max and Timer=0 (S240). Here, processing at step S240 corresponds to a setting the power transmission device max as the current power transmission device.

After the processing at step S220 or the processing at step S240 being performed, the power receiving device 300 determines whether or not Timer=Tmax (S224). If it is determined at step S224 that Timer=Tmax, the power receiving device 300 repeats processing at step 202 and thereafter.

If it is not determined at step S224 that Timer=Tmax, the power receiving device 300 sets Timer=Timer+1 (the so-called count-up) (S224). Then, the power receiving device 300 determines whether or not to end power reception (S226).

If it is not determined at step S226 that power reception is to end, the power receiving device 300 repeats processing at step S222 and thereafter. If it is determined at step S226 that power reception is to end, the power receiving device 300 transmits a power transmission end request to the power transmission device k (S228).

Each of the power receiving devices 300 constituting the power transfer system 1200 according to the second embodiment selects the power transmission device 100 to transmit power to be received by the power receiving device 300 and receives power transmitted by the selected power transmission device 100, for example, by using the power receiving method shown in FIG. 9. Therefore, in the power transfer system 1200, transmission power from one power transmission device to one power receiving device is realized, even if a plurality of power transmission devices is present, without being interfered by other power transmission devices.

Figure 21:
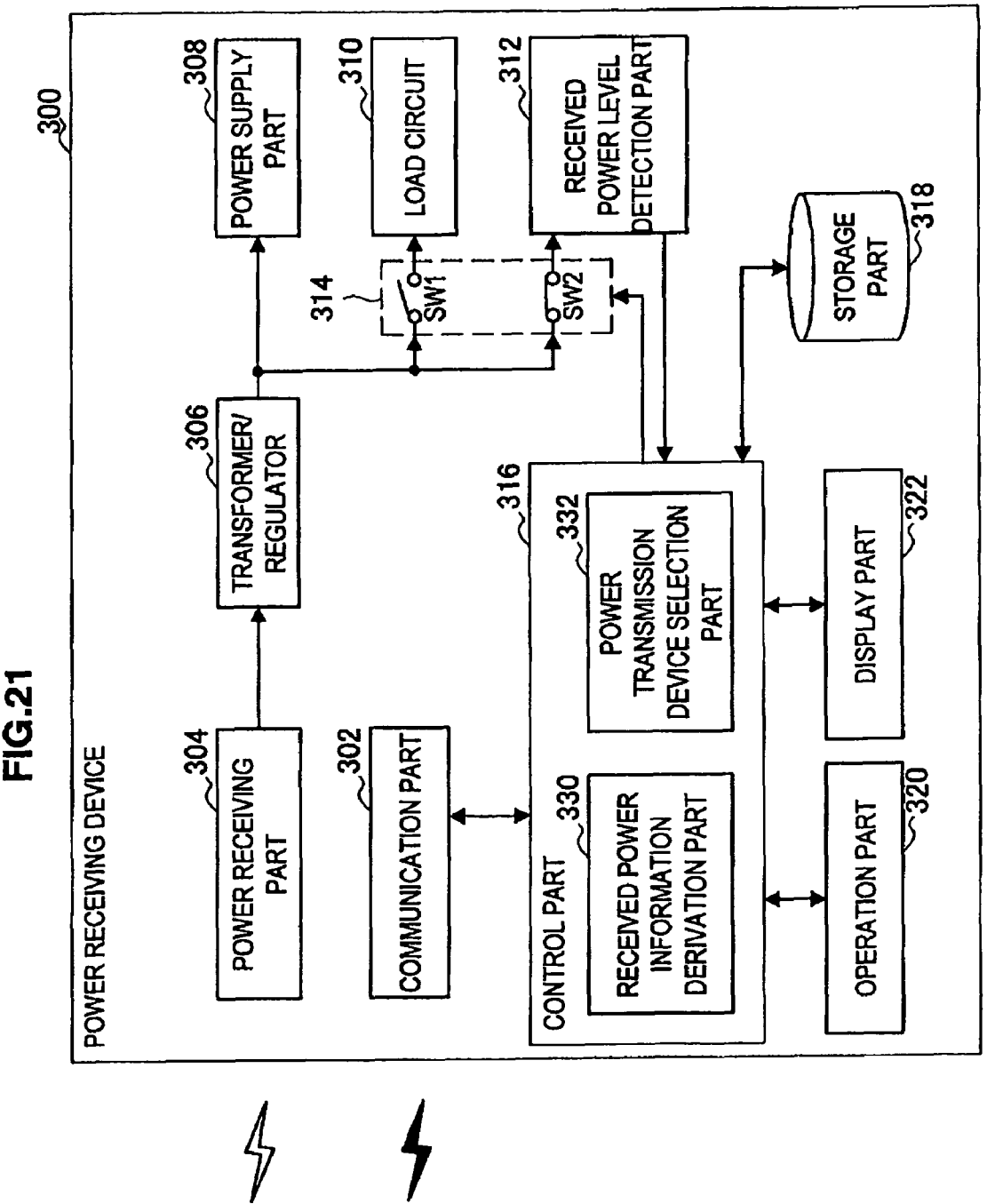
FIG. 21 is an explanatory view exemplifying the configuration of the power transfer system according to the second embodiment of the present invention.

The power transmission device 100 and the power receiving device 300 constituting the power transfer system 1200 according to the second embodiment capable of realizing the above power transfer approaches will be described below. Since the power transmission device 100 can have the same configuration as that of the power transmission device 100 in the first embodiment described above, a description thereof is omitted. FIG. 21 is an explanatory view exemplifying the configuration of the power transfer system 1200 according to the second embodiment of the present invention. As shown in FIG. 21, the power transmission device 100 and the power receiving device 300 transfer power in a non-contact manner. FIG. 21 shows one power receiving device 300 constituting the power transfer system 1200 and the other power receiving device 300 can adopt the same configuration as that of the power receiving device 300 shown in FIG. 21.

[The Power Receiving Device 300]

The power receiving device 300 includes a communication part 302 (receiving side communication part), a power receiving part 304, a transformer/regulator 306, a power supply part 308, a load circuit 310, a received power level detection part 312, a switching part 314, a control part 316, a storage part 318, an operation part 320, and a display part 322. The configuration of the power receiving device 300 is not limited to that shown in FIG. 21 and, for example, a configuration without the power supply part 308 (a configuration driven by received power) may also be adopted.

The power receiving device 300 may also be provided with the ROM (not shown) in which programs and control data such as arithmetic parameters used by the control part 316 are recorded or the RAM (not shown) in which programs and the like executed by the control part 316 are temporarily stored. The power receiving device 300 connects each of the above components, for example, by a bus as a transmission path of data.

[Hardware Configuration Example of the Power Receiving Device 300]

Figure 22:
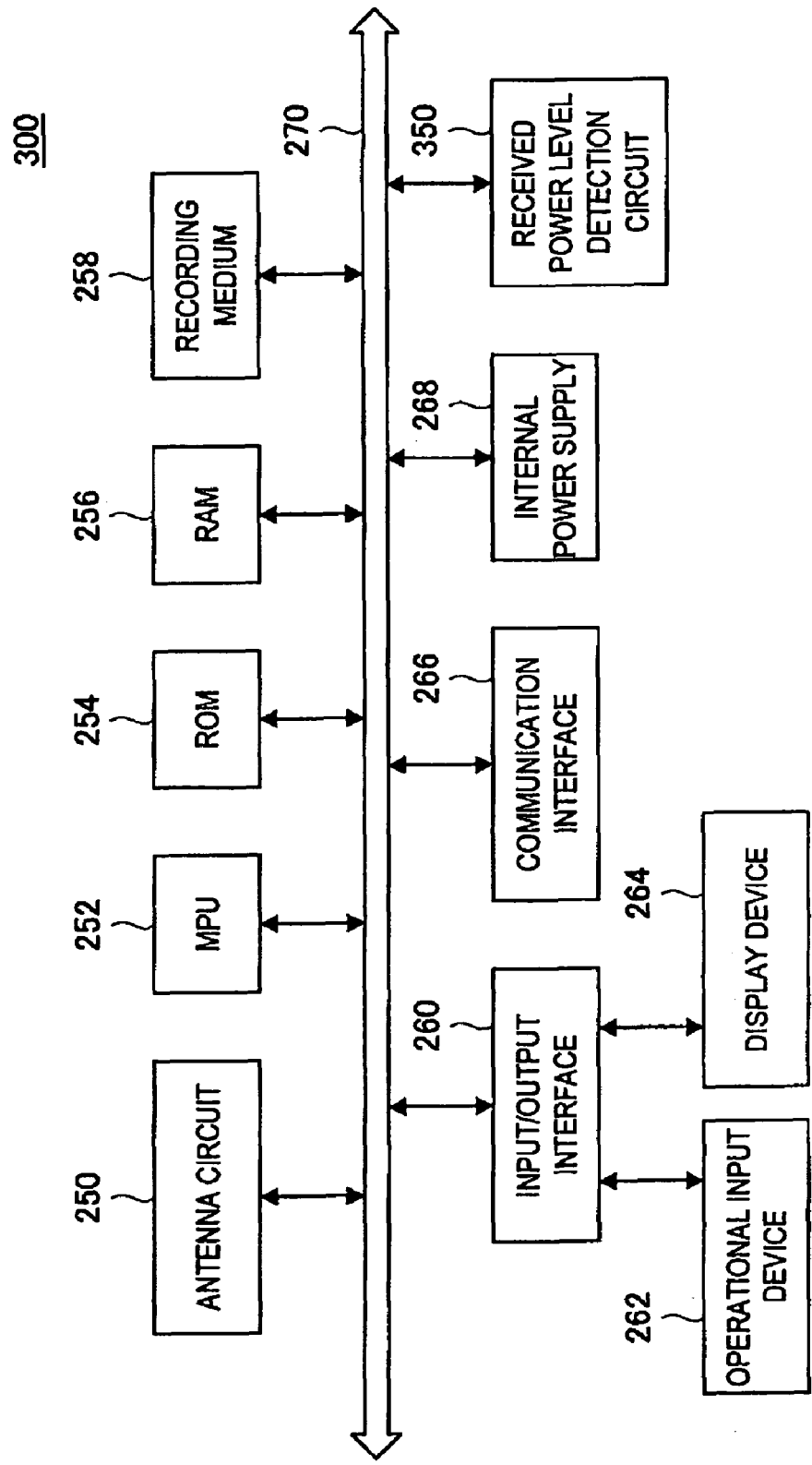
FIG. 22 is an explanatory view exemplifying the hardware configuration of a power receiving device according to the second embodiment of the present invention.

FIG. 22 is an explanatory view exemplifying the hardware configuration of the power receiving device 300 according to the second embodiment of the present invention. Referring to FIG. 22, the power receiving device 300 includes, for example, the antenna circuit 250, the MPU 252, the ROM 254, the RAM 256, the recording medium 258, the input/output interface 260, the operational input device 262, the display device 264, the communication interface 266, the internal power supply 268, and a received power level detection circuit 350. The power receiving device 300 connects each of the above components, for example, by the bus 270 as a transmission path of data.

The antenna circuit 250, the MPU 252, the ROM 254, the RAM 256, the recording medium 258, the input/output interface 260, the operational input device 262, the display device 264, the communication interface 266, and the internal power supply 268 can each have the same configuration as that of the power receiving device 200 according to the first embodiment shown in FIG. 18. Here, the antenna circuit 250 functions as the power receiving part 304 and the MPU 252 as the control part 316. The recording medium 258 functions as the storage part 318, the operational input device 262 as the operation part 320, the display device 264 as the display part 322, and the communication interface 266 as the communication part 302.

The received power level detection circuit 350 functions as the received power level detection part 312 and outputs a detection result depending on the received power level of the received first transmission power Ptrans(p).

<Examples of the Received Power Level Detection Circuit 350>

(i) First Example

Figure 23:
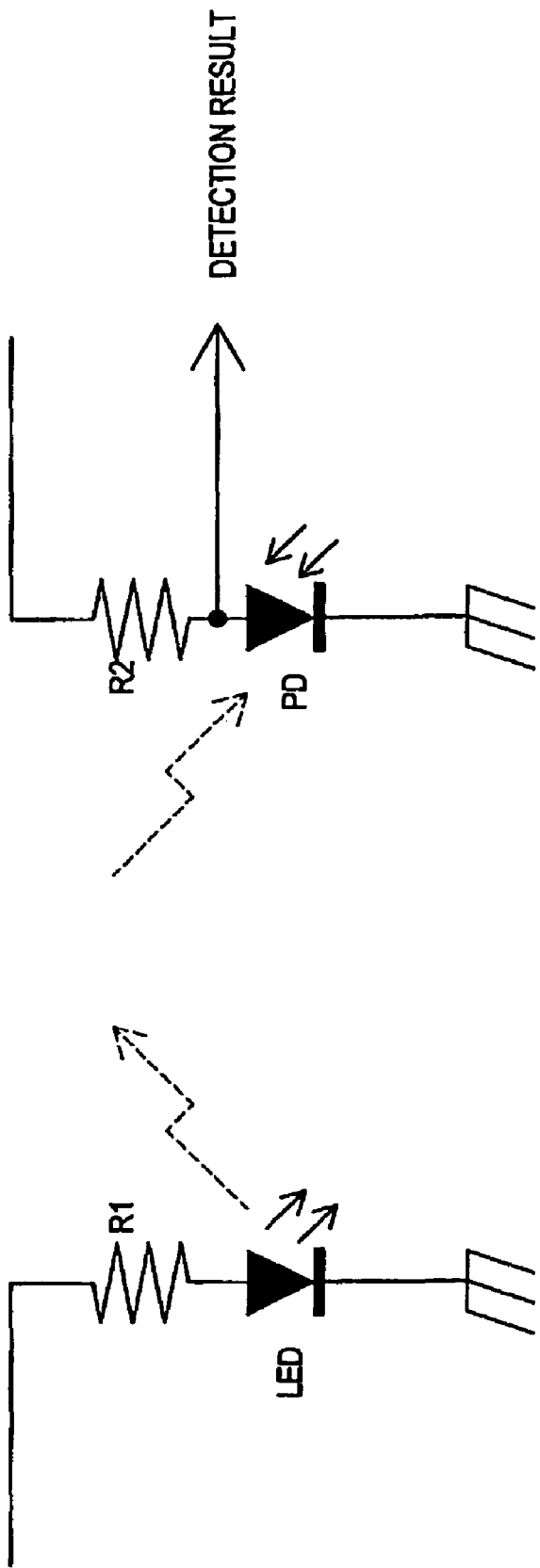
FIG. 23 is an explanatory view showing a first example of a received power level detection circuit according to the second embodiment of the present invention.

FIG. 23 is an explanatory view showing a first example of the received power level detection circuit 350 according to the second embodiment of the present invention. Referring to FIG. 23, a received power level detection circuit 350A according to the first example includes a resistor R1, a light emitting diode LED, a photodiode PD, and a resistor R2. Here, if a load current in accordance with the first transmission power Ptrans(p) is passed to the light emitting diode LED, the light emitting diode LED emits light in accordance with the load current. The photodiode PD plays the role of a so-called photo-detector and detects lights emitted from the light emitting diode LED. The photodiode PD outputs a current in accordance with a detected amount. The received power level detection circuit 350A can output a detection result in accordance with the received power level of the received first transmission power Ptrans(p) by outputting the current in accordance with the detected amount as a detection result.

Here, the resistor R1 and the light emitting diode LED shown in FIG. 23 correspond to a measuring load circuit to derive information of power reception. The photodiode PD and the resistor R2 shown in FIG. 23 correspond to a detection circuit. FIG. 23 shows a configuration in which the received power level detection circuit 350A includes the photodiode PD, but the configuration is not limited to the above example. For example, a received power level detection circuit according to the second embodiment of the present invention may be configured by using various photo-detectors such as a photoresistor.

(ii) Second Example

Figure 24:
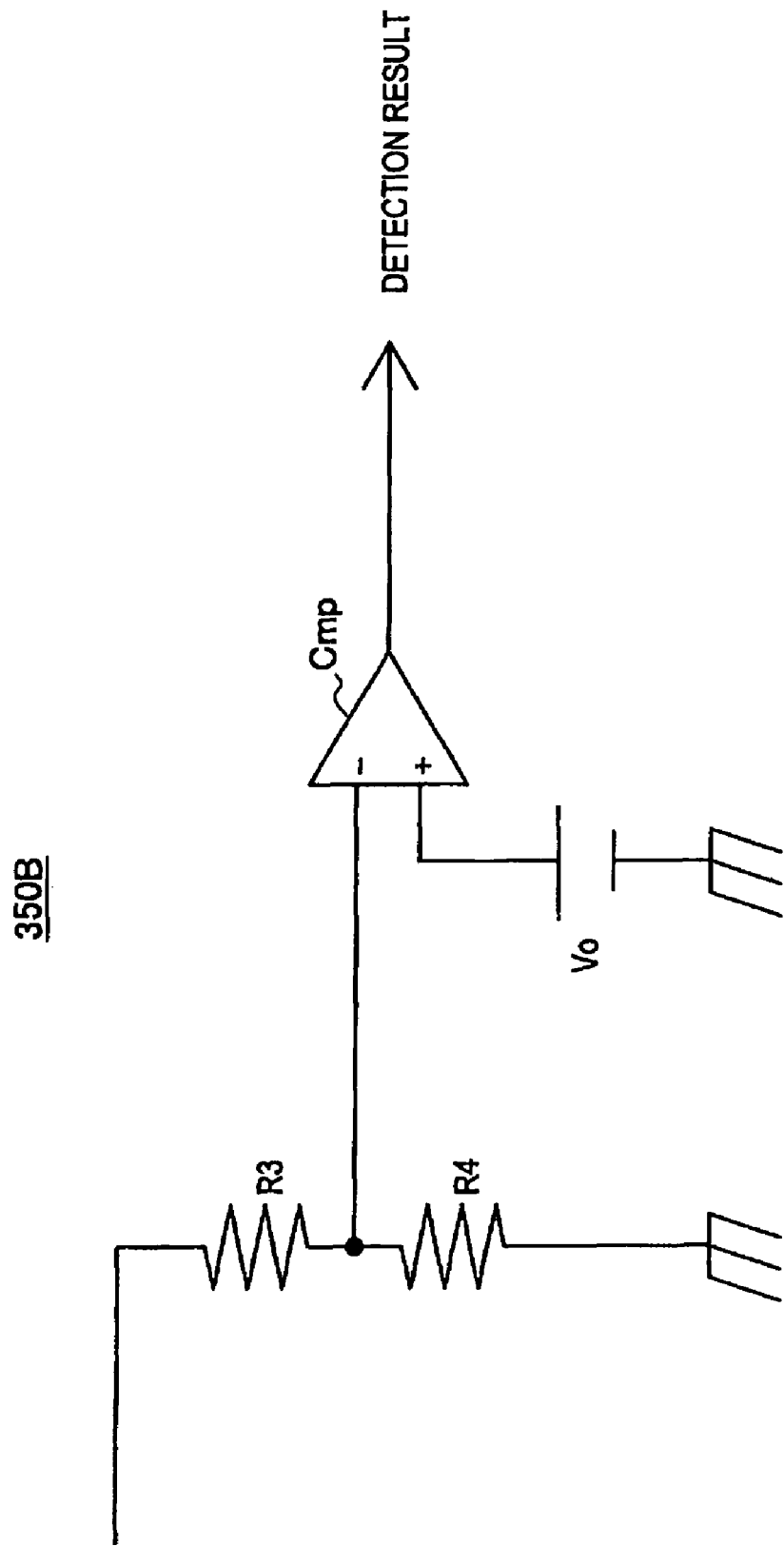
FIG. 24 is an explanatory view showing a second example of the received power level detection circuit according to the second embodiment of the present invention.

FIG. 24 is an explanatory view showing a second example of the received power level detection circuit 350 according to the second embodiment of the present invention. Referring to FIG. 24, a received power level detection circuit 350B according to the second example includes a resistor R3, a resistor R4, and a comparator Cmp. Here the resistor R3 and the resistor R4 produce a partial voltage in accordance with the first transmission power Ptrans(p) and the comparator Cmp compares the partial voltage with a reference voltage Vo. Then, the comparator Cmp outputs the voltage in accordance with a comparison result as a detection result. Therefore, the received power level detection circuit 350B can output a detection result showing whether or not the received power level of the received first transmission power Ptrans(p) satisfies a predetermined level.

Here, the resistor R3 and the resistor R4 shown in FIG. 24 correspond to a measuring load circuit to derive information of power reception. The comparator Cmp shown in FIG. 24 corresponds to a detection circuit. In FIG. 24, the resistor R3 and the resistor R4 are shown as resistors whose resistance is fixed, but are not limited to the above example and the resistor R3 and/or the resistor R4 may be variable resistor. By adopting the resistor R3 and/or the resistor R4 as variable resistor, the received power level detection circuit 350B can make a predetermined level shown by a detection result variable.

(iii) Third Example

Figure 25:
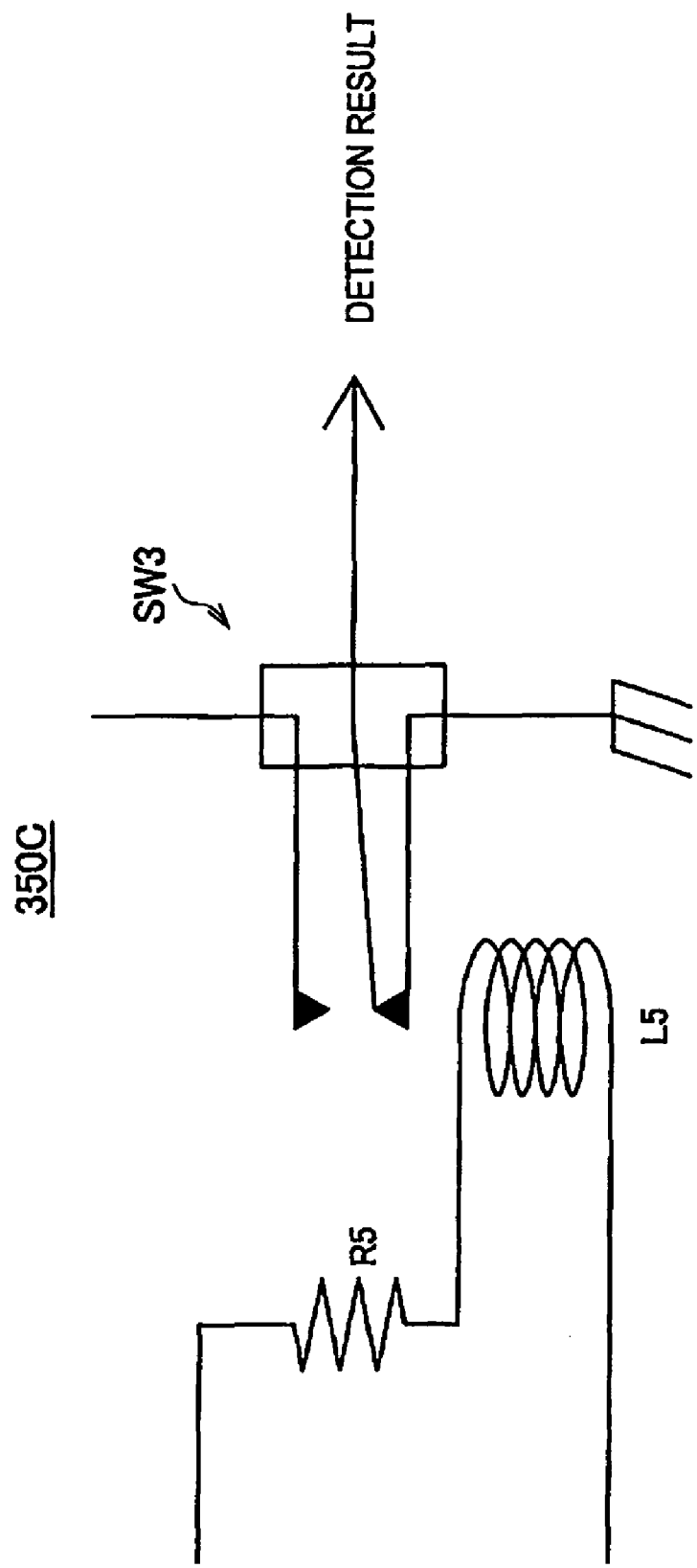
FIG. 25 is an explanatory view showing a third example of the received power level detection circuit according to the second embodiment of the present invention.

FIG. 25 is an explanatory view showing a third example of the received power level detection circuit 350 according to the second embodiment of the present invention. Referring to FIG. 25, a received power level detection circuit 350C according to the third example includes a resistor R5, an inductor L5, and a switch SW3 to constitute an electromagnetic relay switch. Here, with a load current in accordance with the first transmission power Ptrans(p) being passed to the inductor L5, a magnetic field in accordance with the load current is generated. Then, with a switching operation in accordance with strength of the magnetic field in accordance with the load current being performed by the switch SW3, a detection result output from the received power level detection circuit 350C changes. Therefore, the received power level detection circuit 350C can output a detection result in accordance with the received first transmission power Ptrans(p).

The received power level detection circuit 350 can output a detection result in accordance with the received power level of the received first transmission power Ptrans(p) without measuring the value of received power (or a voltage value or current value) by adopting, for example, the configurations shown in FIG. 23 to FIG. 25.

With the hardware configuration as shown in FIG. 22, the power receiving device 300 can derive the coupling coefficient κ (an example of information of power reception) to each of the power transmission devices 100 and select the power transmission device 100 based on the derived coupling coefficients κ.

The configuration of the power receiving device 300 will be described with reference to FIG. 21 again. The communication part 302 is a communication means provided with the power receiving device 300 and plays the role of performing communication with an external device such as the power transmission device 100 by wire/radio communication. Here, the communication part 302 can adopt, for example, a configuration corresponding to that of the communication part 102 of the power transmission device 100. Therefore, for example, the communication part 302 can transmit a power transmission request or a power transmission end request to the power transmission device 100 and receive power transmission information transmitted from the power transmission device 100. Here, communication of the communication part 302 is controlled by the control part 316.

The power receiving part 304 is a power receiving means provided with the power receiving device 300 and plays the role of receiving power transmitted from the power transmission device 100 in a non-contact manner (by radio). Here, the power receiving part 304 can adopt, for example, a configuration corresponding to that of the power transmission part 104 of the power transmission device 100 and receives power by using, for example, electromagnetic induction (first transfer means), radio waves (second transfer means), or resonance of a magnetic field or an electric field (third transfer means, fourth transfer means).

Though not shown in FIG. 21, the power receiving part 304 can change, for example, the resonance frequency relating to power reception based on an adjustment signal delivered from the control part 316. Here, the adjustment signal is selectively delivered from the control part 316 to the power receiving part 304, for example, based on power transmission channel information (for example, the channel for use 78 shown in FIG. 3) contained in power transmission information received by the communication part 302. Means for changing the resonance frequency by the power receiving part 304 includes, for example, changing the electrostatic capacity and/or inductance, but is not limited to the above example.

The transformer/regulator 306 transforms the voltage based on power received by the power receiving part 304 and also smoothes and stabilizes the voltage after transformation.

The power supply part 308 is an internal power supply provided with the power receiving device 300 and accumulates received power. The power supply part 308 also supplies a drive voltage to drive each component of the power receiving device 300. Here, the power supply part 308 includes, for example, a secondary battery such as a lithium-ion rechargeable battery. As described above, the power receiving device 300 according to an embodiment of the present invention may adopt a configuration without the power supply part 308, that is, a configuration driven by directly using received power.

The load circuit 310 corresponds, for example, to a processing circuit capable of driving using directly received power provided with the power receiving device 300. Though not shown in FIG. 21, the load circuit 310 can also cause the communication part 302 to transmit a processing result to another device (for example, the power transmission device 100) or deliver the processing result to the control part 316.

The received power level detection part 312 outputs a detection result in accordance with the received power level of the received power, for example, by adopting the configurations shown in FIG. 23 to FIG. 25. Here, the power receiving device 300 selectively inputs the first transmission power Ptrans(p) into the received power level detection part 312 by controlling the switching part 314. Therefore, the received power level detection part 312 can output a detection result in accordance with the received power level of the received first transmission power Ptrans(p).

The switching part 314 includes a switch SW1 corresponding to the load circuit 310 and a switch SW2 corresponding to the received power level detection part 312. The switching part 314 connects one of the load circuit 310 and received power level detection part 312 to the power receiving part 304 (more precisely, to the transformer/regulator 306) depending on a control signal delivered from the control part 316. For example, the switching part 314 connects the load circuit 310 to the power receiving part 304 when control signal is not delivered and the received power level detection part 312 to the power receiving part 304 when a control signal is delivered. Here, for example, the switch SW1 and the switch SW2 may be configured by mutually different conductivity-type MOSFETs (Metal Oxide Semiconductor Field Effect Transistors), but are not limited to the above example. The control signal is delivered from the control part 316, for example, when the communication part 302 receives a start notification.

The power receiving device 300 can transition (switch) from a normal operation mode (status in which functions held by the power receiving device 300 can be executed) to a received power level detection mode (status to detect the received power level) by being provided with the switching part 314. The power receiving device 300 can also transition from the received power level detection mode to the normal operation mode by being provided with the switching part 314.

The control part 316 includes, for example, an MPU and plays the role of controlling the whole power receiving device 300. The control part 316 also includes a received power information derivation part 330 and a power transmission device selection part 332.

The received power information derivation part 330 plays the role of performing the processing (derivation of information of power reception) in (2-1) described above. More specifically, the received power information derivation part 330 causes the communication part 302 to transmit a start notification to start a derivation of the coupling coefficient κ to the power transmission device 100 and delivers a control signal to the switching part 314. As described above, the received power information derivation part 330 can control the transition (switching) of the power receiving device 300 between the normal operation mode (status in which functions held by the power receiving device 300 can be executed) and the received power level detection mode (status to detect the received power level). Based on a detection result delivered from the received power level detection part 312, the control part 316 determines whether the received power level satisfies a predetermined level. Then, if the control part 316 determines that the received power level satisfies the predetermined level, for example, the control part 316 derives the coupling coefficient κ for each of the power transmission devices 100 by using the Formula 2.

The power transmission device selection part 332 plays the role of performing the processing (selection of the power transmission device 100) in (2-2) and a portion (transmission of a power transmission request) of the processing in (2-3) described above. More specifically, the power transmission device selection part 332 selects the power transmission device 100 to transmit power to be received from among the power transmission devices 100 constituting the power transfer system 1200 based on the coupling coefficient κ (an example of information of power-reception) for each of the power transmission devices 100 derived by the received power information derivation part 330. Here, the power transmission device selection part 332 selects the power transmission device 100, for example, by processing shown in FIG. 19, but the selection method is not limited to the above example.

The power transmission device selection part 332 also causes the communication part 302 to transmit a power transmission request to the selected power transmission device 100 and, if the power transmission device 100 is switched, causes the communication part 302 to transmit a power transmission end request to the power transmission device 100 before the switching.

As described above, the control part 316 can play the role of a communication control part that controls transmission/reception of various kinds of information to/from the power transmission devices 100 constituting the power transfer system 1200.

The control part 316 can also play the role of selectively delivering an adjustment signal to the power receiving part 304 based on, for example, power transmission channel information (for example, the channel for use 78 shown in FIG. 3) contained in power transmission information received by the communication part 302. With an adjustment signal being selectively delivered to the power receiving part 304 by the control part 316, as described above, the power receiving device 300 can receive power using a plurality of power transmission channels.

The storage part 318 is a storage means provided with the power receiving device 300. The storage part 318 stores, for example, information of power consumption (corresponding to Prcv in the Formula 2) used for the derivation of the coupling coefficient κ, various applications and the like. A magnetic recording medium such as a hard disk and a nonvolatile memory such as a flash memory can be cited as the storage part 318, but the storage part 318 is not limited to the above examples.

The operation part 320 is an operation means of the power receiving device 300 enabling a user to perform a predetermined operation. The power receiving device 300 can cause the power receiving device 300 to perform an operation desired by a user by being provided with the operation part 320. Here, for example, an operational input device such as a keyboard and a mouse, a button, a directional key, a rotational selector such as a jog dial, and a combination thereof can be cited as the operation part 320, but the operation part 320 is not limited to the above examples.

The display part 322 is a display means provided with the power receiving device 300 and displays various kinds of information on a display screen. For example, an operation screen to cause the power receiving device 300 to perform a desired operation and a screen to display a communication state or a power transmission state with the power transmission device 100 can be cited as a screen displayed in a display screen of the display part 322, but the screen is not limited to the above examples. Here, for example, an LCD and an organic EL display can be cited as the display part 322, but the display part 322 is not limited to the above examples.

With the above configuration, the power receiving device 300 can derive the coupling coefficient κ (an example of information of power reception) to each of the power transmission devices 100 to select the power transmission device 100 based on the derived coupling coefficient κ.

The power transfer system 1200 according to the second embodiment of the present invention has, as described above, one or the plurality of power transmission devices 100 and one or the plurality of power receiving devices 300. Each of the power transmission devices 100 transmits power to one or the plurality of power receiving devices 300 and the power receiving device 300 receives power transmitted from the power transmission device 100.

Here, each of the power receiving devices 300 selects the power transmission device 100 to transmit power to be received based on information of power reception (for example, the coupling coefficient κ) by using the power transfer approaches according to the second embodiment described above. Then, the power transmission device 100 selected by the power receiving device 300 transmits power to the relevant power receiving device 300. Therefore, the power transfer system 1200 can transmit power, even if a plurality of power transmission devices is present, from one power transmission device to one power receiving device without being interfered by other power transmission devices.

[Program Related to the Power Transfer System 1200]

The power transmission device 100 to transmit power to be received can be selected and power transmitted from the selected power transmission device 100 can be received by a program to cause a computer to function as the power receiving device 300 according to the second embodiment of the present invention.

The power transfer system 1200 capable of transmitting power from one power transmission device to one power receiving device without being interfered by other power transmission devices is realized, even if a plurality of power transmission devices is present, by a program to cause a computer to function as the power receiving device 300 according to the second embodiment of the present invention.

In the foregoing, the power transfer system 1000 (the power transfer system 1100 according to the first embodiment/the power transfer system 1200 according to the second embodiment) according to an embodiment of the present invention has been described by citing the power transmission device 100 as a component constituting the power transfer system 1000, an embodiment of the present invention is not limited to such an embodiment. An embodiment of the present invention may be applied to various kinds of devices, for example, a computer such as a personal computer and server, a disk reproducing device such as a Blu-ray (registered trademark) disk reproducing device, a disk recording and reproducing device such as a Blu-ray (registered trademark) recorder and DVD recorder, and a game machine such as a PlayStation (registered trademark) series.

The power transfer system 1000 (the power transfer system 1100 according to the first embodiment/the power transfer system 1200 according to the second embodiment) according to an embodiment of the present invention has been described by citing the power receiving device 200 or the power receiving device 300 as a component constituting the power transfer system 1000, an embodiment of the present invention is not limited to such an embodiment. An embodiment of the present invention may be applied to various kinds of devices, for example, a computer such as a personal computer, a mobile communication device such as a mobile phone and PHS (Personal Handyphone System), a video/music reproducing device such as WALKMAN (registered trademark), an imaging device such as a digital still camera and digital video camera, and a mobile game machine such as PlayStation Portable (registered trademark).

The present application contains subject matter related to that disclosed in Japanese Priority Patent Application JP 2008-124892 filed in the Japan Patent Office on May 12, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The foregoing described, for example, each of the power transmission device 100 that transmits power and the power receiving device 200 and the power receiving device 300 that receive power, but an embodiment of the present invention is not limited to such a configuration. For example, a power transmission device and a power receiving device according to an embodiment of the present invention may be a transceiver having a transmitting function of power related to the power transmission device 100 and a receiving function of power related to the power receiving device 200 and/or the power receiving device 300 respectively. A power transfer system according to an embodiment of the present invention can realize the power transfer system 1000 (the power transfer system 1100 according to the first embodiment/the power transfer system 1200 according to the second embodiment) described above, even if the power transfer system according to an embodiment of the present invention is configured by the transceiver.

The foregoing showed that a program (computer program) to cause a computer to function as the power transmission device 100 according to the first embodiment of the present invention or a program (computer program) to cause a computer to function as the power receiving device 300 according to the second embodiment of the present invention is provided, but an embodiment of the present invention can further provide a recording medium together in which the program is stored.

The configurations described above show examples of embodiments of the present invention and are naturally included in the technical scope of the present invention.

What is claimed is:

1. A power transmission device comprising:
    a communication part that performs communication with an external power transmission device that transmits power;
    a power transmission part that transmits power to a power receiving device that receives the transmitted power in a non-contact manner;
    a determination part that determines whether power can be transmitted, based on external power transmission information received by the communication part indicating a start of power transmission by the external power transmission device; and
    a power transmission control part that controls the power transmission part to selectively transmit power based on a determination result from the determination part.

2. The power transmission device according to claim 1, wherein the determination part determines that power is not capable of transmitting if the communication part receives the external power transmission information in a predetermined first reception period, and
    the determination part determines that power is capable of transmitting if the communication part does not receive the external power transmission information in the first reception period.

3. The power transmission device according to claim 2, wherein, when the power transmission control part controls the power transmission part to transmit power, the determination part determines that power is not capable of transmitting if the communication part receives the external power transmission information in a second reception period, which is longer than the first reception period, and
    the determination part determines that power is capable of transmitting if the communication part does not receive the external power transmission information in the second reception period.

4. The power transmission device according to claim 2, further comprising
    a power transmission information transmission control part that controls the communication part to selectively transmit power transmission information for a notification of starting power transmission based on the determination result from the determination part.

5. The power transmission device according to claim 4, wherein, when the power transmission information transmission control part controls the communication part to transmit the power transmission information, the power transmission information transmission control part controls the communication part to transmit the power transmission information for a predetermined period until the power transmission part terminate power transmission.

6. The power transmission device according to claim 1, wherein the power transmission control part controls power to be transmitted from the power transmission part to the power receiving device in each predetermined period being divided into a plurality of divided periods.

7. The power transmission device according to claim 6, wherein the determination part determines a blank divided period in which the external power transmission device does not transmit power, based on the received external power transmission information.

8. The power transmission device according to claim 1, wherein the power transmission part transmits power using one or more power transmission channels, and
    the determination part determines whether power is capable of transmitting for each of the power transmission channels based on external power transmission information containing information of the power transmission channels for power transmission.

9. A power transmission method comprising the steps of:
    receiving external power transmission information transmitted from an external power transmission device indicating a start of power transmission by the external power transmission device to transmit power, in a predetermined reception period;
    determining whether power can be transmitted, based on the external power transmission information received at the receiving step; and
    transmitting power selectively based on a determination result at the determining step.

10. A computer-readable medium encoded with a program causing a computer to execute the steps of:
    receiving external power transmission information transmitted from an external power transmission device indicating a start of power transmission by the external power transmission device to transmit power, in a predetermined reception period;
    determining whether power can be transmitted, based on the external power transmission information received at the receiving step; and
    transmitting power selectively based on a determination result at the determining step.

11. A power receiving device comprising:
    a receiving-side communication part that communicates with one or more power transmission devices that transmit power;

a power receiving part that receives power transmitted from the power transmission device in a non-contact manner;

a received power level detection part that outputs a detection result in accordance with a received power level, based on first transmission power transmitted from the power transmission device, the first transmission power increasing discretely;

a received power information derivation part that derives information of power reception specifying a status relating to transmission power to the power receiving device, based on a detection result from the received power level detection part, for each of the power transmission devices; and a power transmission device selection part that selects the power transmission device based on the derived information of power reception and causes the receiving-side communication part to transmit a power transmission request for requesting the selected power transmission device to transmit power.

12. The power receiving device according to claim 11, wherein the power transmission device selection part derives a coupling coefficient to the power transmission device as information of the power reception.

13. A power transfer system comprising:

a plurality of power transmission devices that transmit power; and a power receiving device that receives power transmitted from the power transmission devices, wherein each of the power transmission devices, includes a communication part that communicates with other power transmission device, a power transmission part that transmits power to the power receiving device in a non-contact manner, a determination part that determines whether power can be transmitted, based on external power transmission information received by the communication part indicating a start of power transmission by the external power transmission device, and a power transmission control part that controls the power transmission part to selectively transmit power based on a determination result from the determination part.

* * * * *